(12) United States Patent
Yamamoto et al.

(10) Patent No.: US 12,174,445 B2
(45) Date of Patent: Dec. 24, 2024

(54) CAMERA MODULE MANUFACTURING DEVICE

(71) Applicants: PFA Corporation, Saitama (JP); TECHNO HORIZON CO., LTD., Aichi (JP)

(72) Inventors: Tsukasa Yamamoto, Saitama (JP); Fujio Asano, Saitama (JP); Koji Imagawa, Saitama (JP); Hideho Miyake, Saitama (JP); Hiroki Takagaki, Nagano (JP); Koji Matama, Nagano (JP)

(73) Assignees: PFA Corporation, Saitama (JP); TECHNO HORIZON CO., LTD., Aichi (JP)

( * ) Notice: Subject to any disclaimer, the term of this patent is extended or adjusted under 35 U.S.C. 154(b) by 257 days.

(21) Appl. No.: 17/799,686

(22) PCT Filed: Feb. 26, 2020

(86) PCT No.: PCT/JP2020/007682
§ 371 (c)(1),
(2) Date: Aug. 14, 2022

(87) PCT Pub. No.: WO2021/171412
PCT Pub. Date: Sep. 2, 2021

(65) Prior Publication Data
US 2023/0069195 A1 Mar. 2, 2023

(51) Int. Cl.
*G02B 7/02* (2021.01)
*G01M 11/02* (2006.01)
*G03B 17/00* (2021.01)

(52) U.S. Cl.
CPC ............ *G02B 7/02* (2013.01); *G01M 11/0214* (2013.01); *G01M 11/0221* (2013.01); *G03B 17/00* (2013.01)

(58) Field of Classification Search
CPC ..... G02B 7/02; G02B 27/62; G01M 11/0214; G01M 11/0221; G03B 17/00;
(Continued)

(56) References Cited

U.S. PATENT DOCUMENTS

| 10,187,636 B2 | 1/2019 | Wong et al. |
| 2009/0180021 A1* | 7/2009 | Kikuchi ............... H04N 17/002 348/E5.042 |

(Continued)

FOREIGN PATENT DOCUMENTS

| JP | 2012058139 | 3/2012 |
| JP | 4960308 | 6/2012 |

(Continued)

OTHER PUBLICATIONS

"International Search Report (Form PCT/ISA/210) of PCT/JP2020/007682," mailed on Apr. 14, 2020, with English translation thereof, pp. 1-4.

*Primary Examiner* — Tarifur R Chowdhury
*Assistant Examiner* — Carlos Perez-Guzman
(74) *Attorney, Agent, or Firm* — JCIPRNET

(57) ABSTRACT

Provided is a camera module manufacturing device including central and peripheral optical units respectively including central and peripheral collimator lenses and central and peripheral measurement charts disposed inclined relative to respective planes vertical to the respective optical axes of the central and peripheral collimator lenses, the central and peripheral optical units being for forming respective images of the central and peripheral measurement charts on the image sensor through the central and peripheral collimator lenses, respectively, and the shooting lens, wherein each peripheral optical unit is disposed such that the optical axis of the peripheral collimator lens is inclined relative to the (Continued)

optical axis of the central collimator lens of the central optical unit, and the angle of inclination is changeable.

13 Claims, 20 Drawing Sheets

(58) Field of Classification Search
CPC ........ G03B 30/00; G03B 43/00; H04N 23/60;
H04N 23/54; H04N 23/57; H04N 23/55
See application file for complete search history.

(56) References Cited

U.S. PATENT DOCUMENTS

| | | | |
|---|---|---|---|
| 2011/0311213 | A1 | 12/2011 | Lin |
| 2015/0192752 | A1 | 7/2015 | Lu |
| 2016/0061594 | A1* | 3/2016 | Kim ................... G01M 11/0214 |
| | | | 348/302 |
| 2016/0323486 | A1* | 11/2016 | Takase ................. H04N 17/002 |
| 2017/0201744 | A1 | 7/2017 | Wong et al. |
| 2019/0361191 | A1 | 11/2019 | Wang et al. |
| 2020/0329181 | A1* | 10/2020 | Lee ....................... H04N 17/002 |

FOREIGN PATENT DOCUMENTS

| | | |
|---|---|---|
| JP | 5460406 | 4/2014 |
| JP | 2016092761 | 5/2016 |
| TW | I479219 | 4/2015 |
| TW | I572936 | 3/2017 |

\* cited by examiner

VIEW ALONG B-B

CAMERA MODULE MANUFACTURING DEVICE

CROSS-REFERENCE TO RELATED APPLICATION

This application is a 371 application of the international PCT application serial no. PCT/JP2020/007682, filed on Feb. 26, 2020. The entirety of each of the above-mentioned patent applications is hereby incorporated by reference herein and made a part of this specification.

TECHNICAL FIELD

This disclosure relates to a camera module manufacturing device for connecting a lens unit and a sensor substrate carrying an image sensor thereon.

BACKGROUND

A known camera module includes integration of a lens unit including a shooting lens and a sensor substrate carrying thereon an image sensor, such as a CCD, a CMOS, or the like. In such a camera module, the position of the sensor substrate relative to the lens unit is adjusted such that the imaging plane of the image sensor substantially coincides with the image forming plane of the lens unit, and the sensor substrate is then adhered to the lens unit with UV light curing resin with the position adjusted (refer to Patent Documents 1 and 2, for example).

CITATION LIST

Patent Literature

PATENT DOCUMENT 1: the specification of JP Patent No. 5460406B
PATENT DOCUMENT 2: the specification of JP Patent No. 4960308B

SUMMARY

Technical Problem

The conventional camera module manufacturing device described in Patent Document 1 or 2 captures an image of a measurement sheet while moving the position of the sensor substrate relative to the lens unit to detect a change in focus evaluation value of the image relative to the position of the sensor substrate to thereby adjust the position of the sensor substrate in accordance with the change in focal evaluation value. This requires obtaining images of the measurement chart at many different positions on the sensor substrate, which leads to a problem in that position adjustment takes time. Further, in manufacturing a camera module including a lens unit having an angle of view different from the originally designed angle, the conventional camera module manufacturing device described in Patent Document 1 or 2 requires exchange of the measurement charts or optical units for guiding light to the lens unit in accordance with the angle of view of the lens unit so that the image of the peripheral measurement chart is formed on a peripheral portion of the image sensor. This leads to a problem in that the conventional camera module manufacturing device described in Patent Document 1 or 2 takes time and labor to switch the types of camera modules to be manufactured.

In view of the above, an object of the present disclosure is to complete adjustment of the relative positions of a lens unit and a sensor substrate in a camera module manufacturing device in a short period of time to thereby improve productivity, and also to accommodate change of the type of a camera module to be manufactured with a simple method.

Solution to Problem

A camera module manufacturing device according to the present disclosure is a camera module manufacturing device for adjusting the relative positions of a lens unit having a built-in shooting lens and a sensor substrate carrying an image sensor for converting an image formed through the shooting lens into an image signal, and adhering the lens unit and the sensor substrate with the relative positions adjusted, the camera module manufacturing device including: an optical module including a central optical unit including a central collimator lens and a central measurement chart disposed inclined relative to a plane vertical to the optical axis of the central collimator lens, the central optical unit being for forming an image of the central measurement chart on the central portion of the image sensor through the central collimator lens and the shooting lens, and at least two peripheral optical units each including a peripheral collimator lens and a peripheral measurement chart disposed inclined relative to a plane vertical to the optical axis of the peripheral collimator lens, each peripheral optical unit being for forming images of the peripheral measurement chart on different peripheral portions of the image sensor through the peripheral collimator lens and the shooting lens, and a controller for adjusting the relative positions of the lens unit and the sensor substrate, based on a central image signal obtained by converting by the image sensor the image of the central measurement chart formed on the central portion of the image sensor by the central optical unit, and respective peripheral image signals obtained by converting by the image sensor the respective images of the respective peripheral measurement charts formed on the respective peripheral portions of the image sensor by the respective peripheral optical units, wherein each peripheral optical unit is disposed such that the optical axis of the peripheral collimator lens is inclined relative to the optical axis of the central collimator lens of the central optical unit, and the angle of inclination is adjustable.

As the central and peripheral measurement charts are disposed so as to be inclined relative to the respective planes vertical to the respective optical axes of the central and peripheral collimator lenses, as described above, the height of the image forming plane of the shooting lens for each measurement chart changes relative to the distance from the optical axis of the shooting lens in a direction orthogonal to the optical axis. Thus, it is possible to obtain a plurality of images of each measurement chart formed on the image forming plane of the shooting lens at different heights with one image capturing operation, to obtain change characteristics of a focus evaluation value, such as a spatial frequency response or the like, relative to a height displacement between the image forming plane of the shooting lens and the imaging plane of the image sensor with one image capturing operation, and to adjust the relative positions of the lens unit and the sensor substrate. This makes it possible to adjust the relative positions of the lens unit and the sensor substrate in a short period of time, to thereby improve productivity. Further, as the angle of inclination of the optical axis of the peripheral collimator lens of each peripheral optical unit relative to the optical axis of the central collimator lens is changeable, changing the angle of inclination in accordance with the angle of view of the shooting lens makes it possible to form an image of the peripheral measurement chart on a peripheral portion of the image sensor. This enables use of a simple method to accommodate change in the type of a camera module to be manufactured.

In the camera module manufacturing device according to the present disclosure, the respective peripheral optical units may be disposed such that the optical axes of the adjacent peripheral collimator lenses cross each other on a plane vertical to the optical axis of the central collimator lens. The image sensor may be rectangular, and the respective peripheral optical units may be disposed such that the respective angles defined by the optical axes of the adjacent peripheral collimator lenses on the plane vertical to the optical axis of the central collimator lens are coincident with the respective angles defined by the two diagonals of the image sensor. The camera module manufacturing device may further include a sensor substrate holding unit for holding the sensor substrate carrying the image sensor mounted thereon, wherein the sensor substrate holding unit may hold the sensor substrate inside the plane vertical to the optical axis of the central collimator lens such that the respective directions of the diagonals of the image sensor coincide with the respective directions of the optical axes of the respective peripheral collimator lenses on the plane vertical to the optical axis of the central collimator lens.

With the above, it is possible to form an image of each peripheral measurement chart at a corner of the image sensor even when the angle of view of the shooting lens has been changed. This enables highly accurate adjustment of the relative positions of the lens unit and the sensor substrate.

The camera module manufacturing device according to this disclosure may further include a lens unit holding unit for holding the lens unit, wherein each peripheral optical unit may be disposed such that the focal position of the peripheral collimator lens is the same position as the focal position of the central collimator lens of the central optical unit, the lens unit holding unit may hold the lens unit such that the focal position of the central collimator lens and the focal position of each peripheral collimator lens fall on the position of the entrance pupil of the shooting lens, the central collimator lens of the central optical unit may form an image of the central measurement chart through the entrance pupil of the shooting lens on the central portion of the image sensor, and the respective peripheral collimator lenses of the peripheral optical units may form images of the respective peripheral measurement charts on respective different peripheral portions of the image sensor through the entrance pupil of the shooting lens.

As described above, as the lens unit is held such that the focal point position of the central collimator lens and the focal point position of each peripheral collimator lens fall on the position of the entrance pupil of the shooting lens, the central collimator lens and the shooting lens together constitute a central measurement chart-side optical system, while each peripheral collimator lens and the shooting lens together constitute a peripheral measurement chart-side optical system. Then, the central collimator lens forms an image of the central measurement chart on the imaging plane of the image sensor through the entrance pupil of the shooting lens. With the central measurement chart disposed inclined relative to a plane vertical to the optical axis of the central collimator lens, the heights of image forming planes of an image formed by the shooting lens which corresponds to an image formed on the imaging plane of the image sensor vary in accordance with the distance from the optical axis of the central collimator lens in a direction orthogonal to the optical axis. Similarly, the peripheral collimator lens forms an image of the peripheral measurement chart on the imaging plane of the image sensor through the entrance pupil of the shooting lens. With the peripheral measurement chart disposed inclined relative to a plane vertical to the optical axis of the peripheral collimator lens, the heights of image forming planes of an image formed by the shooting lens which corresponds to an image is formed on the imaging plane of the image sensor vary in accordance with the distance from the optical axis of the peripheral collimator lens in a direction orthogonal to the optical axis. This makes it possible to accurately calculate a focus evaluation value, such as a spatial frequency response, with one image capturing operation. This enables adjustment of the lens unit and the sensor substrate in a short period of time, and thus can further improve productivity.

Advantageous Effects of Invention

The camera module manufacturing device according to this disclosure can adjust the relative positions of the lens unit and the sensor substrate in a short period of time in order to improve productivity, and accommodate change of the type of a camera module to be produced with a simple method.

DESCRIPTION OF EMBODIMENTS

With reference to the accompanying drawings, a camera module manufacturing device 100 according to an embodiment will now be described. Initially, referring to FIG. 1 to FIG. 10, the structure of the camera module manufacturing device 100 will be described.

Figure 1:
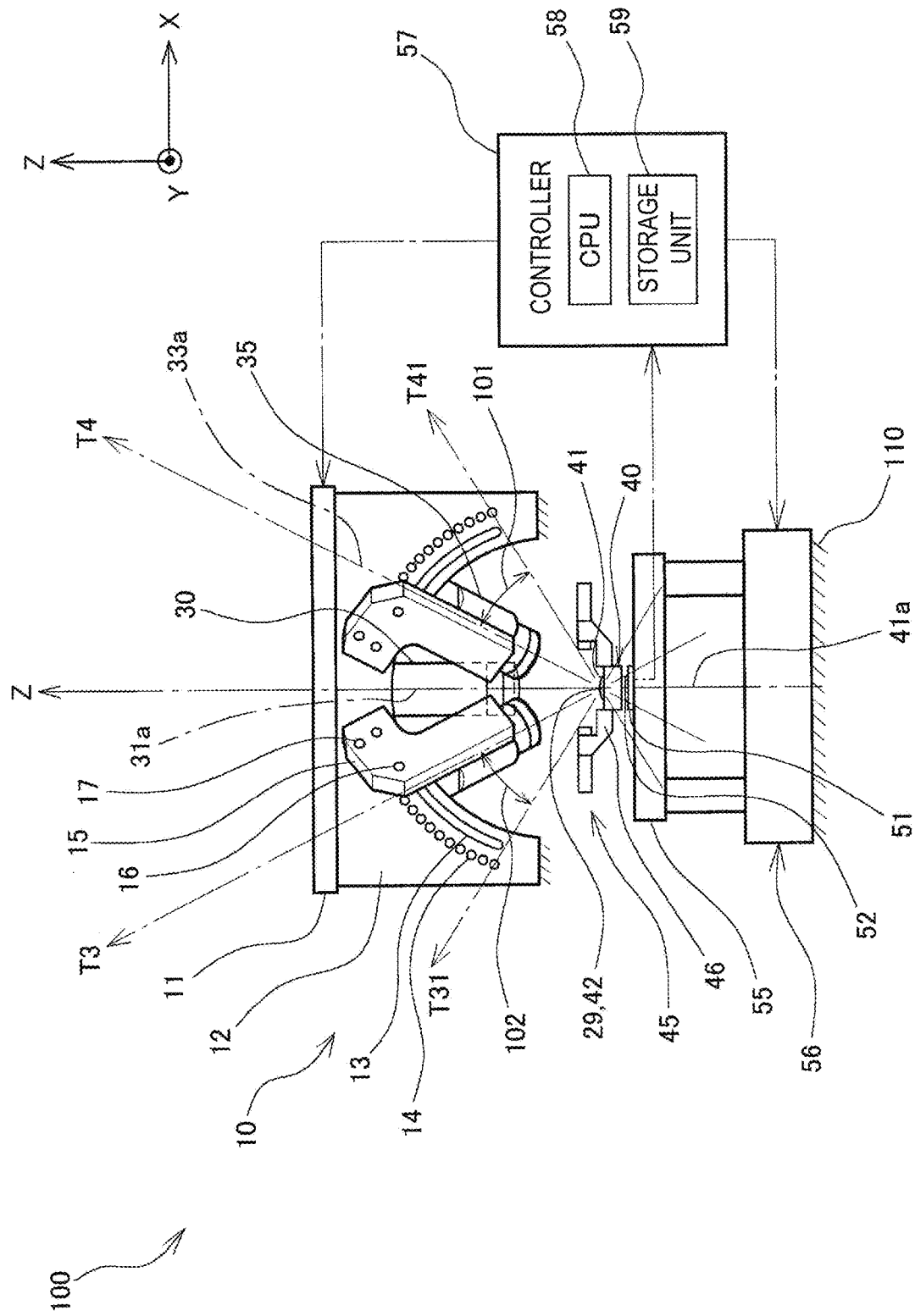
FIG. 1 is a side view of a camera module manufacturing device according to an embodiment.

As illustrated in FIG. 1, the camera module manufacturing device 100 is a device for adhering a lens unit 40 having a built-in shooting lens 41, and a sensor substrate 51 having an image sensor 52 mounted thereon to manufacture a camera module 50. The camera module manufacturing device 100 includes an optical module 10, a robot arm 45 for holding the lens unit 40, a stage 55 having the sensor substrate 51 on its upper surface, a six-axis actuator 56 for moving the position of the stage 55 in six axial directions, and a controller 57 for controlling the six-axis actuator 56. Note that the robot arm 45 constitutes a lens-unit holding unit, and the stage 55 constitutes a sensor-substrate holding unit. The following description is made based on an assumption, as illustrated in FIG. 2, that the horizontal direction in which a central measurement chart 32 built in a central optical unit 30 extends is defined as the X direction, a direction orthogonal to the X direction on a horizontal plane is defined as the Y direction, a vertical direction is defined as the Z direction, the positive side in the Z direction is defined extending in the upper direction, and the negative side in the Z direction is defined extending in the lower direction.

As illustrated in FIG. 1, the optical module 10 includes a base 11, a guide plate 12 mounted on the lower surface of the base 11, the central optical unit 30 mounted at the center on the lower surface of the base 11, and four peripheral optical units 35 each mounted on the guide plate 12 via a bracket 15.

Figure 2:
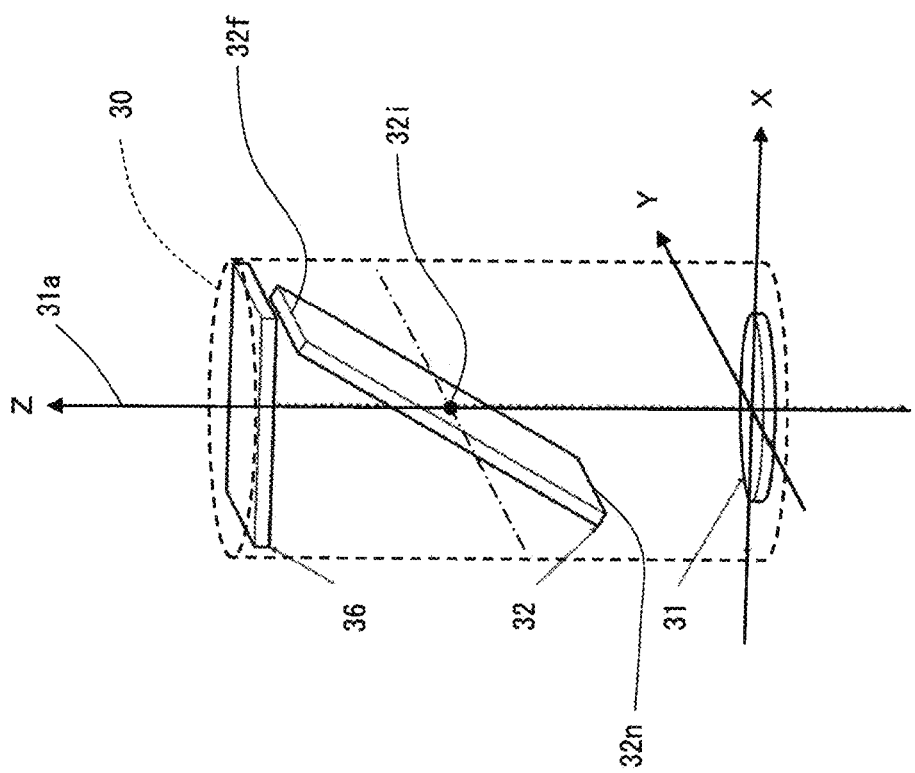
FIG. 2 is a perspective view of the structure of the central optical unit of a camera module manufacturing device according to an embodiment.
Figure 3:
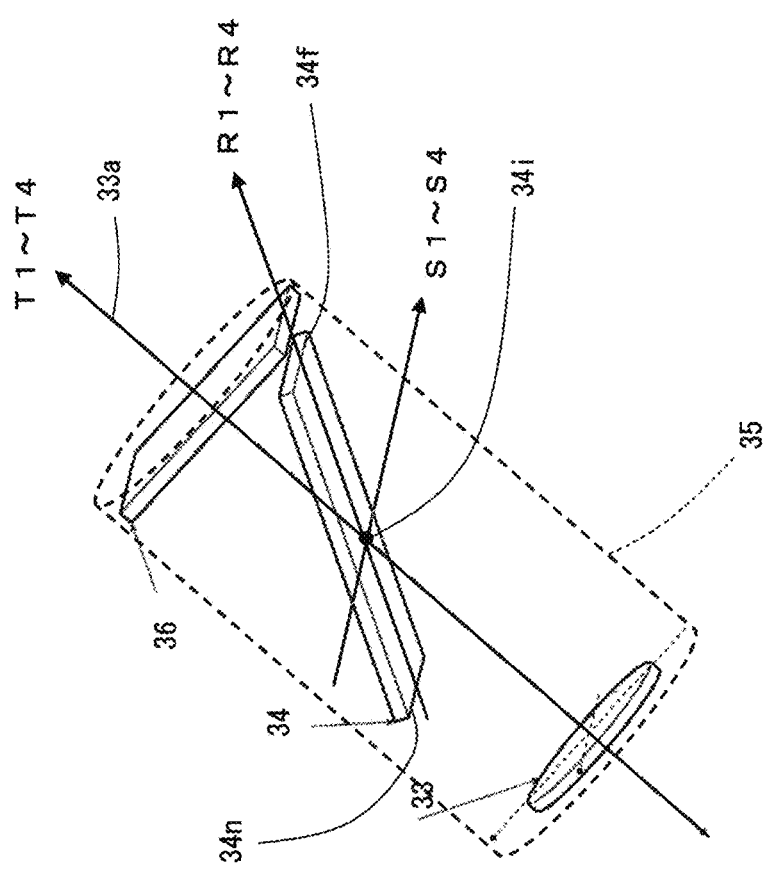
FIG. 3 is a perspective view of the structure of a peripheral optical unit of a camera module manufacturing device according to an embodiment.

As illustrated in FIG. 2, the central optical unit 30 includes a central collimator lens 31, the central measurement chart 32 disposed inclined relative to a plane vertical to the optical axis 31a of the central collimator lens 31, and a light source 36 including an LED or the like, which are all integrally disposed in a cylindrical casing. Meanwhile, as illustrated in FIG. 3, each peripheral optical unit 35 as well includes a peripheral collimator lens 33, a peripheral measurement chart 34 disposed inclined relative to a plane vertical to the optical axis 33a of the peripheral collimator lens 33, and a light source 36 including an LED or the like, which are all integrally disposed in a cylindrical casing. Details of the central measurement chart 32 and the peripheral measurement chart 34 will be described later. In the following description, the directions extending along the respective optical axes 33a of the peripheral collimator lenses 33 on the respective surfaces of the peripheral measurement charts 34 from the center toward the outer circumference of the optical module 10 are defined as directions R1 to R4, respectively, and the directions orthogonal to the directions R1 to R4 on the respective surfaces of the peripheral measurement charts 34 are defined as directions S1 to S4, respectively.

Figure 4:
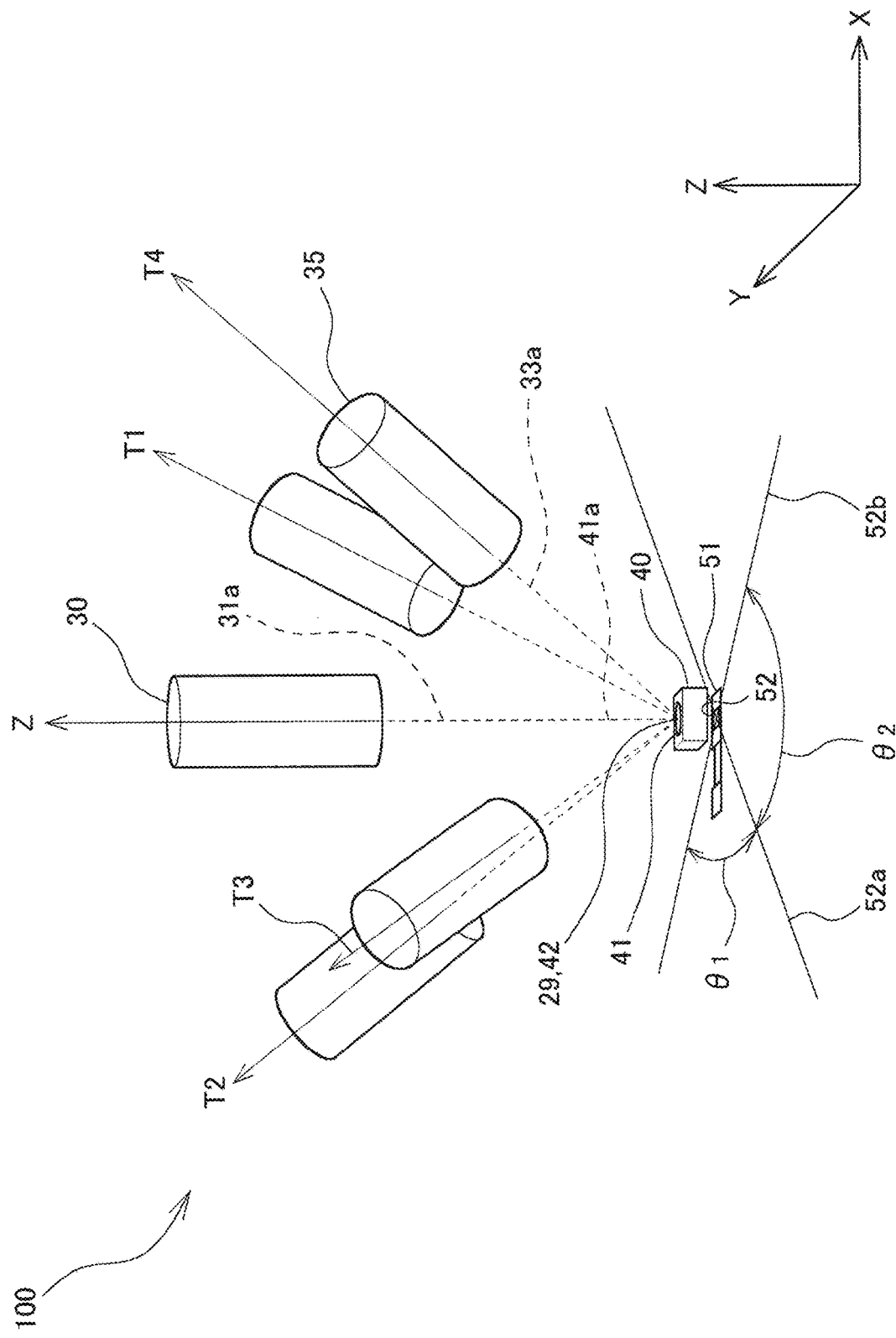
FIG. 4 is a perspective view illustrating the disposition of the central optical unit and a plurality of peripheral optical units of a camera module manufacturing device according to an embodiment.

As illustrated in FIG. 4, the central optical unit 30 is disposed at the center of the optical module 10 such that the optical axis 31a of the central collimator lens 31 extends in the Z direction. Meanwhile, each peripheral optical unit 35 is disposed such that the optical axis 33a of the peripheral collision lens is inclined relative to the optical axis 31a of the central collimator lens 31 of the central optical unit 30. The central optical unit 30 and the peripheral optical units 35 are mounted on the base 11 and the guide plates 12, respectively, such that the optical axis 31a of the central collimator lens 31 built in the central optical unit 30 crosses the optical axis 33a of the peripheral collimator lens 33 built in each peripheral optical unit 35 at one point 29, and that the respective focal points 31f, 33f of the central collimator lens 31 and the peripheral collimator lens 33 fall on the one point 29. Here, each peripheral optical unit 35 is mounted on the guide plate 12 such that the optical axis 33a of each peripheral collimator lens 33 is changeable between the direction T4 and the direction T41, or between the direction T3 and the direction T31, and the angle of inclination defined by the optical axis 33a of the peripheral collimator lens 33 relative to the optical axis of the central collimator lens 31 is changeable, as indicated by arrows 101, 102 in FIG. 1, which is to be described later in detail.

Figure 5:
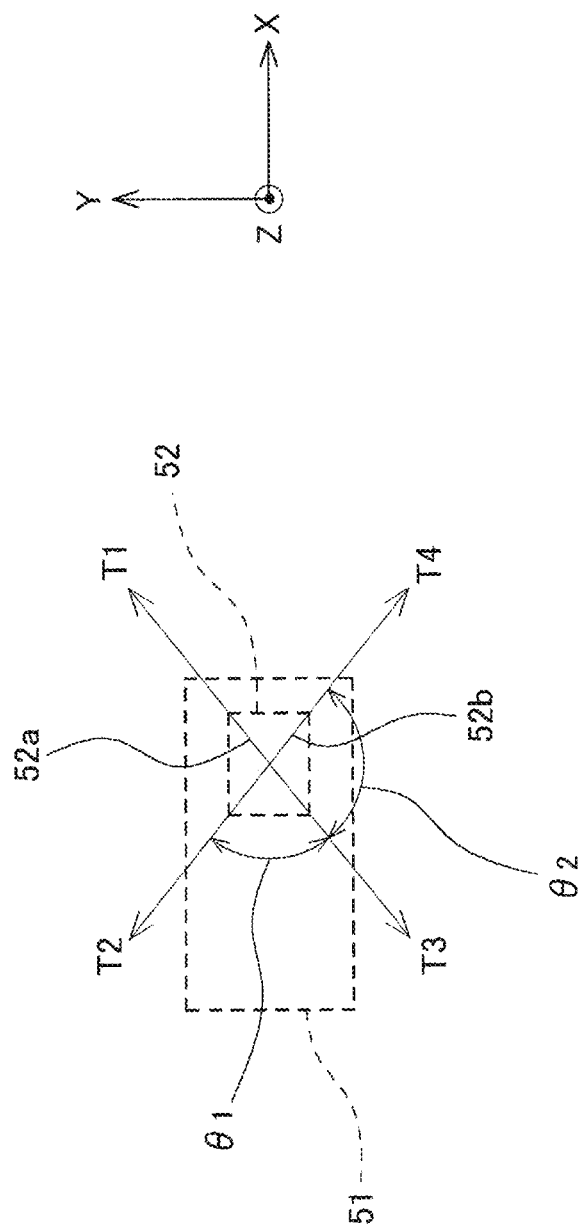
FIG. 5 is a plan view illustrating the relationship between an image sensor mounted on a sensor substrate held by a camera module manufacturing device according to an embodiment and the directions of the optical axes of the peripheral collimator lenses.

As illustrated in FIG. 4 and FIG. 5, the respective peripheral optical units 35 are disposed such that the angles defined by the optical axes 33a of the adjacent peripheral collimator lenses 33 on a plane vertical to the optical axis 31a of the central collimator lens 31 coincide with the respective angles θ1, θ2 defined by the two diagonals 52a, 52b of the rectangular image sensor. Note that the angle θ1 and the angle θ2 are a smaller angle and a larger angle, respectively, of the angles defined by the two diagonals 52a, 52b. Thus, assuming that the respective directions in which the respective optical axes 33a of the peripheral collimator lenses 33 of the four peripheral optical units 35 extend are defined as directions T1 to T4, when the image sensor 52 is disposed such that the optical axis 31a of the central collimator lens 31 passes through the center of the image sensor 52 and the longer edge and the shorter edge of the image sensor 52 extend in the X direction and the Y direction, respectively, the directions in which the two diagonals 52a, 52b of the image sensor 52 extend coincide with the respective directions T1 to T4 on a plane vertical to the optical axis 31a of the central collimator lens 31.

Figure 6:
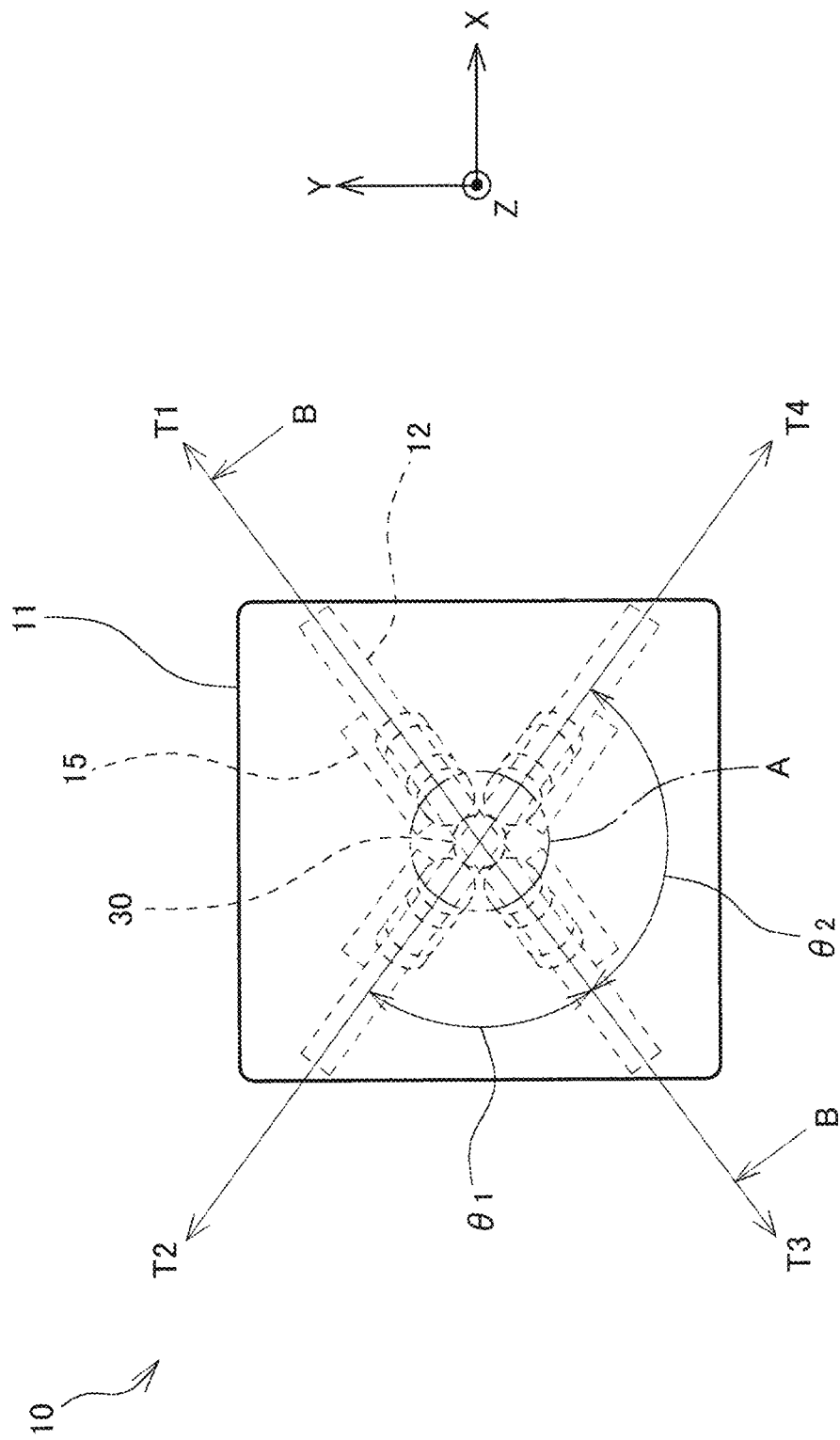
FIG. 6 is a plan view of the optical module of a camera module manufacturing device according to an embodiment.

As illustrated in FIG. 6, the two guide plates 12 are mounted on the lower surface of the rectangular base 11 so as to together define the angles θ1, θ2. Here, the rectangular base 11 is disposed such that its edges extend in the X direction and the Y direction, respectively. Thus, when the image sensor 52 is set such that the directions in which the respective edges of the rectangular base 11 extend coincide with those in which the longer edge and the shorter edge of the image sensor 52 respectively extend, the directions in which the two guide plates 12 extend coincide with the directions in which the two diagonals 52a, 52b of the image sensor 52 extend; namely, the directions T1 to T4 on a plane vertical to the optical axis 31a of the central collimator lens 31.

Figure 7:
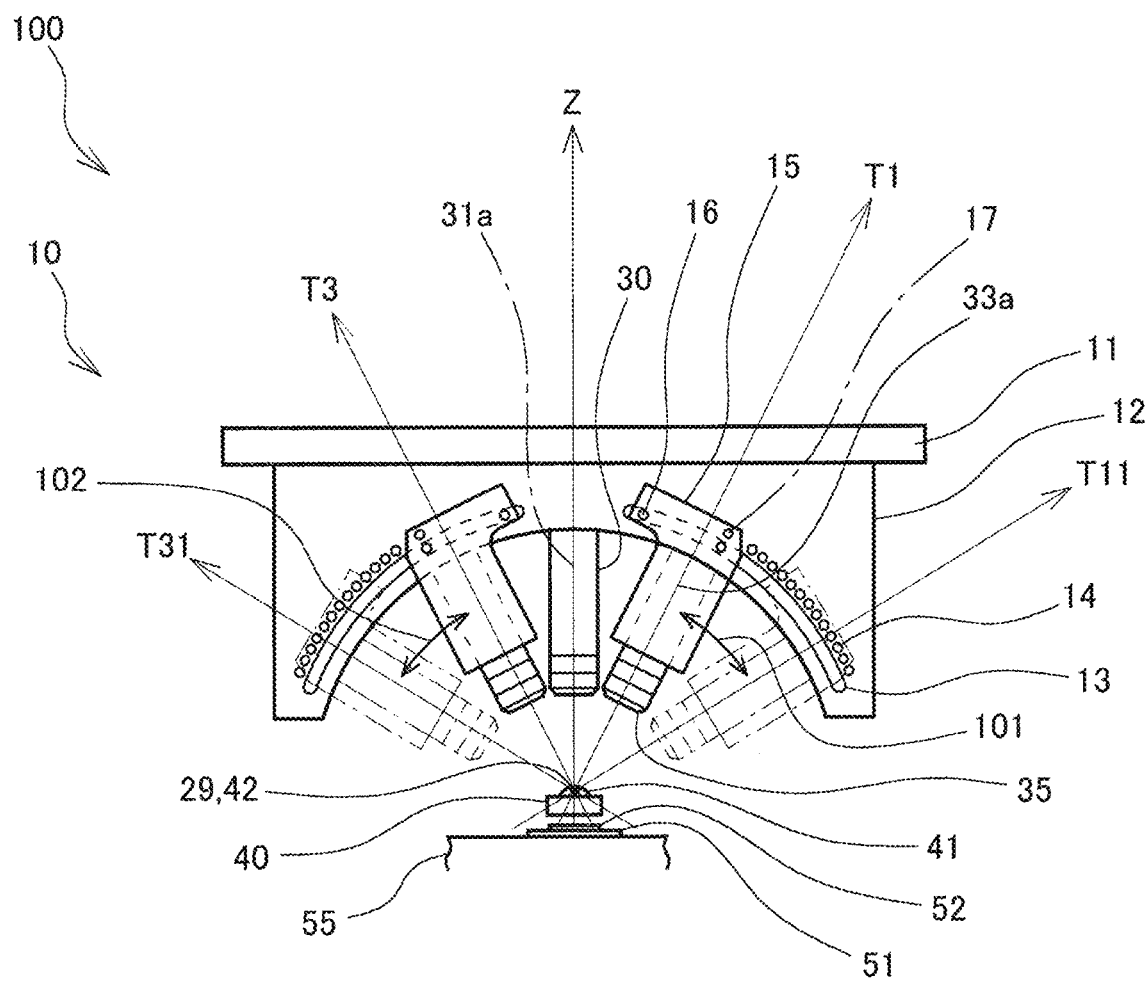
FIG. 7 is an elevation view of the optical module of a camera module manufacturing device according to an embodiment along the line B-B shown in FIG. 6.

As illustrated in FIG. 7, each guide plate 12 is a flat plate whose lower surface is cut into an arc shape with the one point 29 as the center. Each guide plate 12 has a guide slit 13 formed thereon extending in an arc shape with the one point 29 as the center along the arc cut. On the outer circumferential side of the guide slit 13, pin holes 14 for fixture of the position of the bracket 15 carrying the peripheral optical unit 35 thereon are formed aligned in an arc shape. The bracket 15, on which the peripheral optical unit 35 is mounted, moves in an arc manner, while being guided along the guide slit 13 with a pin 16 inserted in the guide slit 13. With a fixing pin 17 inserted into a hole formed on the bracket 15 and the pin hole 14 of the guide plate 12, the bracket 15 is fixed at a predetermined angular position.

The guide slit 13 is formed in an arc shape with the one point 29 as the center. The guide plates 12 extend in the respective directions in which the two diagonals 52a, 52b of the image sensor 52 extend. Hence, the respective peripheral optical units 35 move in an arc manner from the direction T1 to the direction T11, or from the direction T3 to the direction T31, as indicated by the arrows 101, 102, above the shooting lens 41 within respective vertical planes containing the two respective diagonals 52a, 52b of the image sensor 52 with the optical axes 33a of the peripheral collimator lenses 33 passing through the one point 29.

Figure 8:
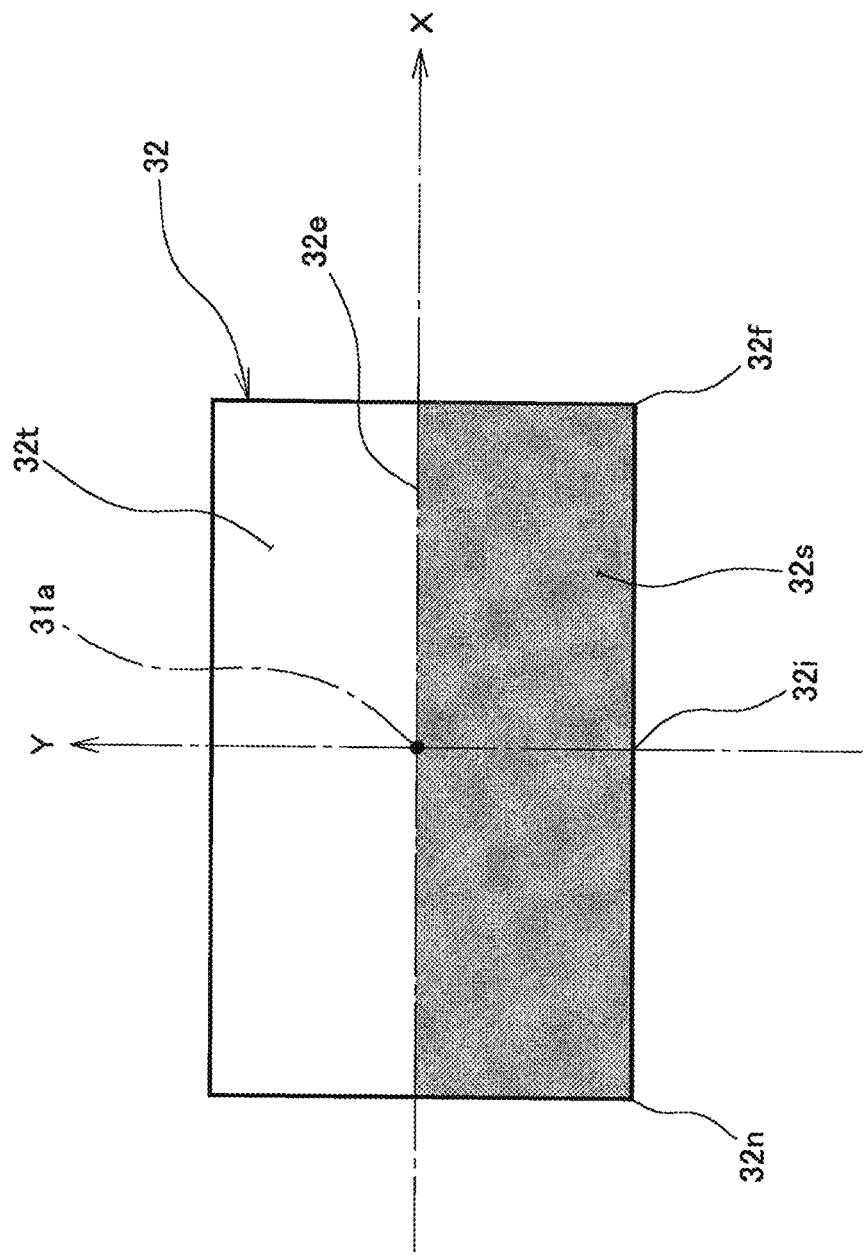
FIG. 8 is a plan view illustrating the pattern of a central measurement chart.

The central measurement chart 32 and the peripheral measurement chart 34 will now be described. As illustrated in FIG. 8, the central measurement chart 32 is a light transmissive transparent glass plate having a light shielding portion 32s for shielding light formed on its surface. Specifically, a half of the central measurement chart 32 on the positive side in the Y direction constitutes a light transmissive portion 32t, where light passes, while the other half, on the negative side in the Y direction, constitutes the light shielding portion 32s, where light does not pass. The light shielding portion 32s may be formed, for example, through etching with black chrome or coating with black paint. Between the light transmissive portion 32t and the light shielding portion 32s, a middle edge 32e is formed extending in the X direction.

As illustrated in FIG. 2, the central measurement chart 32 is installed in the enclosure of the central optical unit 30 so as to be inclined such that the optical axis 31a of the central collimator lens 31 passes through the central position 32i at the middle in the X direction, with the distal end 32f positioned on the upper side in the inclination direction and the proximal end 32n positioned on the lower side in the inclination direction. Accordingly, the middle edge 32e, illustrated in FIG. 8, is a edge extending in the inclination direction while passing through the optical axis 31a of the central collimator lens 31.

Figure 9:
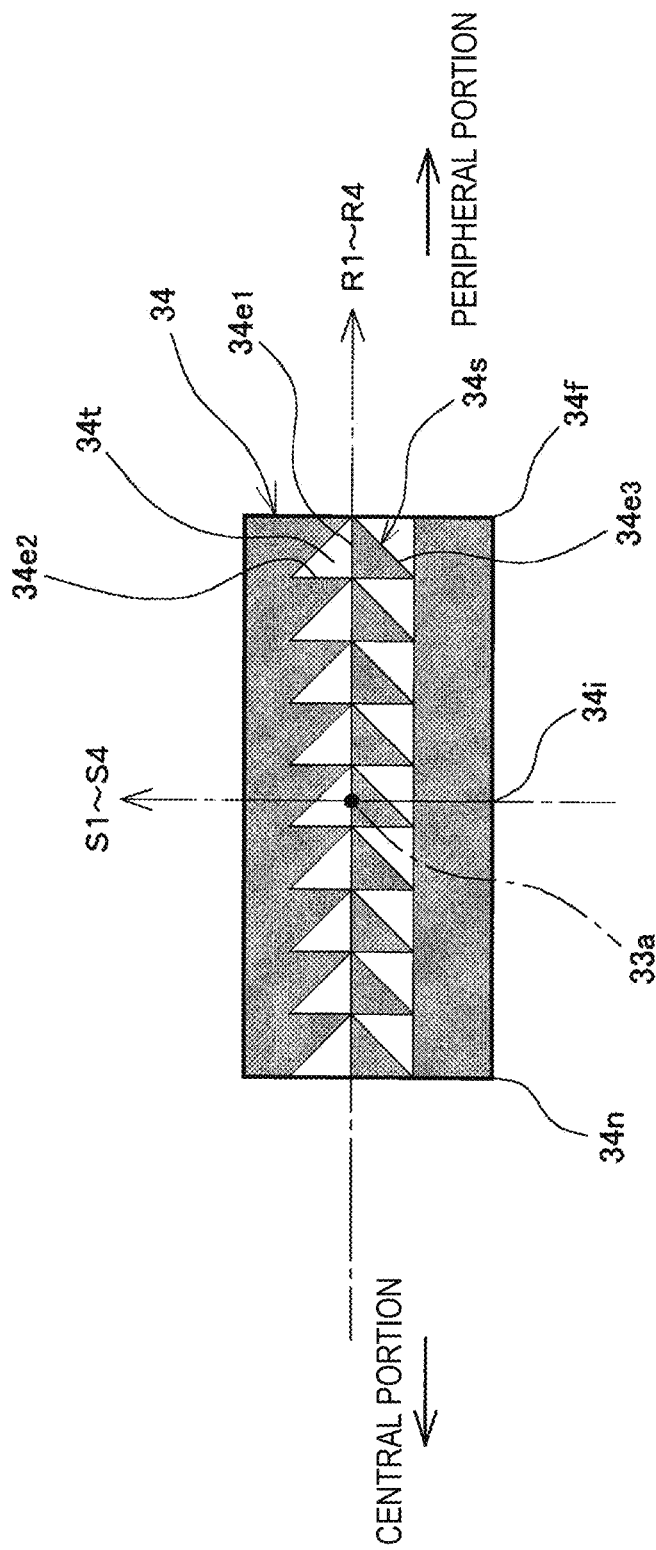
FIG. 9 is a plan view illustrating the pattern of a peripheral measurement chart.

As illustrated in FIG. 9, each peripheral measurement chart 34 is a chart including triangular light transmissive portions 34t and triangular light shielding portions 34s which are alternately disposed adjacent to each other in the direction R1 to R4 and in the orthogonal direction S1 to S4. The light shielding portion 34s may be formed, for example, through etching with black chrome or coating with black paint. Between the triangular light shielding portion 34s and the light transmissive portion 34t disposed adjacent to each other on the respective sides of the axis R1 to R4, a first edge 34e1 is defined extending in the direction R1 to R4. Between the triangular light shielding portion 34s and the triangular light transmissive portion 34t disposed adjacent to each other in the direction R1 to R4, a second edge 34e2 is defined extending in the direction S1 to S4. In the direction of the triangular light transmissive portion 34t, the direction being inclined by 45 degrees relative to the direction R1 to R4, a third edge 34e3 is defined.

Meanwhile, as illustrated in FIG. 3, each peripheral measurement chart 34 is installed in the enclosure of the peripheral optical unit 35 so as to be inclined such that the optical axis 33a of the peripheral collimator lens 33 passes through the central position 34i at the middle in the direction R1 to R4, with the distal end 34f positioned on the upper side in the inclination direction and the proximal end 34n positioned on the lower side in the inclination direction. Accordingly, as illustrated in FIG. 9, the first edge 34e1 is a edge extending in the inclination direction while passing through the optical axis 33a of the peripheral collimator lens 33, and the second edge 34e2 and the third edge 34e3 are edges extending in respective directions intersecting with the first edge 34e1.

Figure 10:
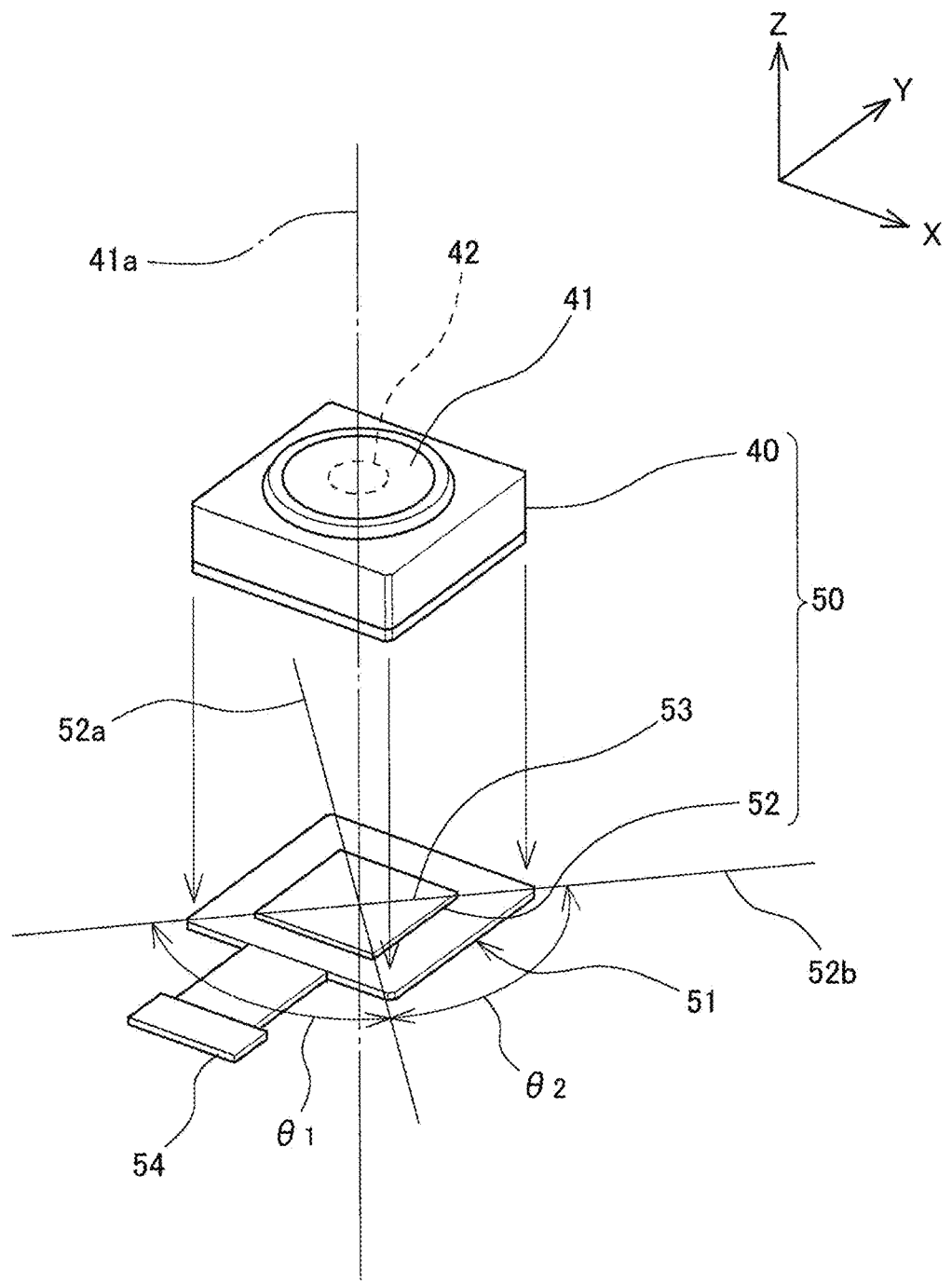
FIG. 10 is a perspective view of a camera module to be assembled by a camera module manufacturing device according to an embodiment.

As illustrated in FIG. 10, the camera module 50 includes a combination of the lens unit 40 including the built-in shooting lens 41, and the sensor substrate 51 carrying the image sensor 52 thereon, in which the lens unit 40 and the sensor substrate 51 are adhered to each other with UV curing adhesive agent.

An entrance pupil 42 on the upper surface of the shooting lens 41 built in the lens unit 40 is an area where the light from the central collimator lens 31 and the respective peripheral collimator lenses 33 enters.

The image sensor 52 converts an image formed on an imaging plane 53 through the shooting lens 41 into an electrical image signal. The sensor substrate 51 has an output terminal 54 for outputting an image signal from the image sensor 52. The output terminal 54 is connected to the controller 57. An image signal outputted from the image sensor 52 is inputted to the controller 57.

As illustrated in FIG. 1, on the lower side of the optical module 10, the six-axis actuator 56, the stage 55, and the robot arm 45 are provided. The six-axis actuator 56 is mounted on a pedestal 110. The stage 55 is mounted on the upper side of the six-axis actuator 56, for holding the sensor substrate 51 on its upper surface. The robot arm 45 is disposed between the upper side of the stage 55 and the lower side of the optical module 10, for holding the lens unit 40. Note that the optical module 10 is mounted on the pedestal 110 via a frame, not illustrated.

The six-axis actuator 56 incorporates six stepping motors, and drives the respective stepping motors to move the stage 55 mounted on the upper side in six directions; namely, in the X, Y, and Z directions and around the X, Y, and Z axes. The six-axial actuator 56 is connected to the controller 57. Each stepping motor operates in response to an instruction from the controller 57. A stepping motor is not an exclusive example, and a servomotor may be used to drive the stage 55.

The stage 55 has a holder, not illustrated, on its upper surface for holding the sensor substrate 51, and holds the sensor substrate 51 on its upper surface. The stage 55 may hold the sensor substrate 51 on its upper surface through vacuum suction. The holder of the stage 55 holds the sensor substrate 51 on the upper surface of the stage 55 such that the optical axis 31a of the central collimator lens 31 passes through the center of the image sensor 52, and that the longer edge and the shorter edge of the image sensor 52 extend in the X direction and the Y direction, respectively. Hence, with the sensor substrate 51 set on the stage 55, the directions in which the two diagonals 52a, 52b of the image sensor 52 extend coincide with the respective directions T1 to T4, in which the respective optical axes 33a of the peripheral collimator lenses 33 of the four peripheral optical units 35 extend on a plane vertical to the optical axis 31a of the central collimator lens 31.

The robot arm 45 has a chuck 46 attached to its tip end, for sandwiching, to thereby hold, the lens unit 40. The robot arm 45 moves in the X, Y, and Z directions together with the chuck 46 by means of a driving device, not illustrated. The robot arm 45 causes the chuck 46 at its tip end to operate to sandwich, and to thereby pick up, the lens unit 40 in the storage of the lens unit 40. The robot arm 45 then moves the lens unit 40 to above the sensor substrate 51 held on the stage 55 to hold the lens unit 40 in a position on the upper side of the sensor substrate 51.

The controller 57 is a computer that incorporates a CPU 58 for information processing and a storage unit 59 for storing an operating program, data, and so forth. The six-axis actuator 56, the robot arm 45, and the light source 36 are connected to the controller 57, and operate in response to an instruction from the controller 57. The image sensor 52 is connected to the controller 57. An image signal outputted from the image sensor 52 is inputted to the controller 57.

The controller 57 causes the robot arm 45 to hold the lens unit 40 at a predetermined position on the upper side of the sensor substrate 51, and causes the six-axis actuator 56 to adjust the position of the upper surface of the stage 55 in the respective X, Y, and Z directions and around the respective X, Y, and Z axes, to thereby adjust the relative positions of the lens unit 40 and the sensor substrate 51 in the respective X, Y, and Z directions and around the respective X, Y, and Z axes.

Referring to FIGS. 11 to 20, an operation of the camera module manufacturing device 100 having the above described structure will now be described.

As illustrated in FIG. 1, initially, the sensor substrate 51 is placed on the upper surface of the stage 55 and held on the upper surface of the stage 55. UV curing adhesive agent is applied to the connection portion of the sensor substrate 51 for connection to the lens unit 40.

The controller 57 causes the robot arm 45 to pick up the lens unit 40 in the storage, and to move the lens unit 40 to above the sensor substrate 51 held on the upper surface of the stage 55. Specifically, the controller 57 holds the lens unit 40 with the robot arm 45 such that the optical axis 41a of the shooting lens 41 is positioned coaxial with the optical axis 31a of the central collimator lens 31, and that the one point 29, where the focal point 31f of the central collimator lens 31 and the focal point 33f of each peripheral collimator lens 33 are positioned, falls on the central position of the entrance pupil 42 of the shooting lens 41.

Then, the controller 57 activates the six-axis actuator 56 to set the imaging plane 53 of the image sensor 52 at a predetermined initial position. The predetermined initial position may be, for example, an originally designed position.

As described earlier, the holder of the stage 55 holds the sensor substrate 51 such that the directions in which the two diagonals 52a, 52b of the image sensor 52 extend coincide with the respective directions T1 to T4, in which the respective optical axes 33a of the peripheral collimator lenses 33 of the four peripheral optical units 35 extend on a plane vertical to the optical axis 31a of the central collimator lens 31. Hence, with the sensor substrate 51 set on the stage 55, the respective optical axes 33a of the peripheral collimator lenses 33 of the peripheral optical units 35 are positioned on the respective vertical planes containing the two respective diagonals 52a, 52b of the image sensor 52.

Figure 11:
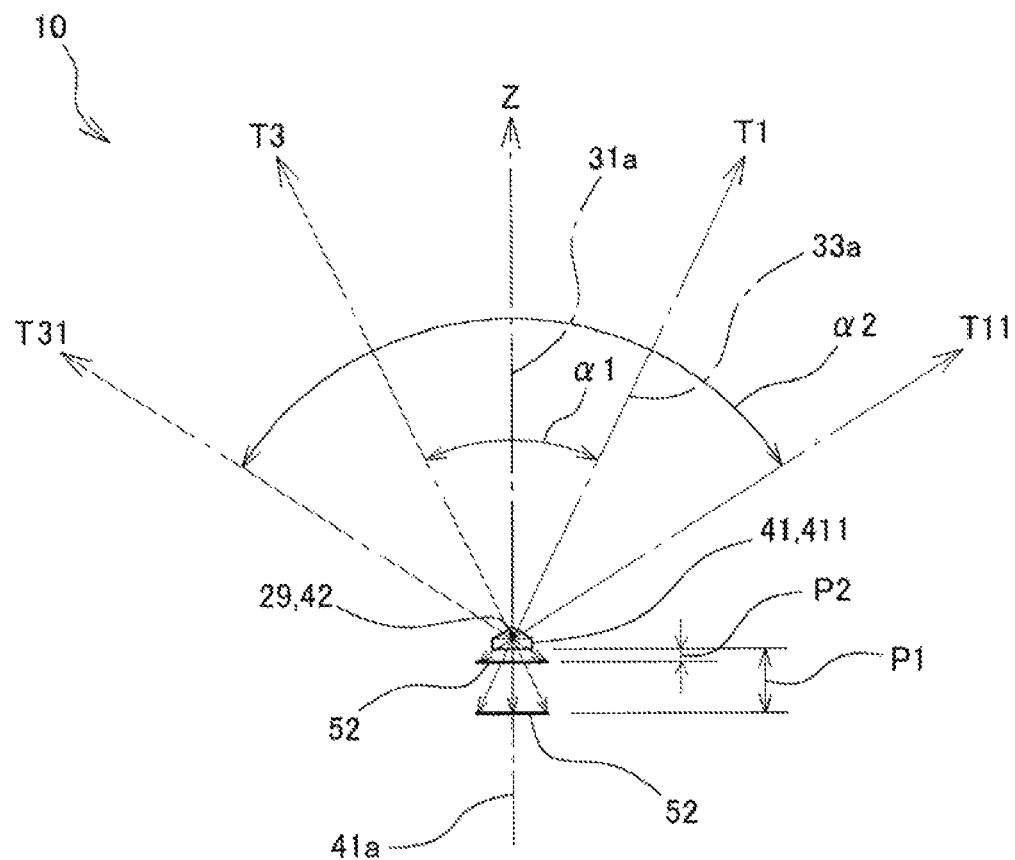
FIG. 11 is an elevation view illustrating optical paths along which respective light beams from the central optical unit and the peripheral optical unit pass through a shooting lens to reach the imaging plane of the image sensor, viewed along the line B-B shown in FIG. 6.
Figure 12:
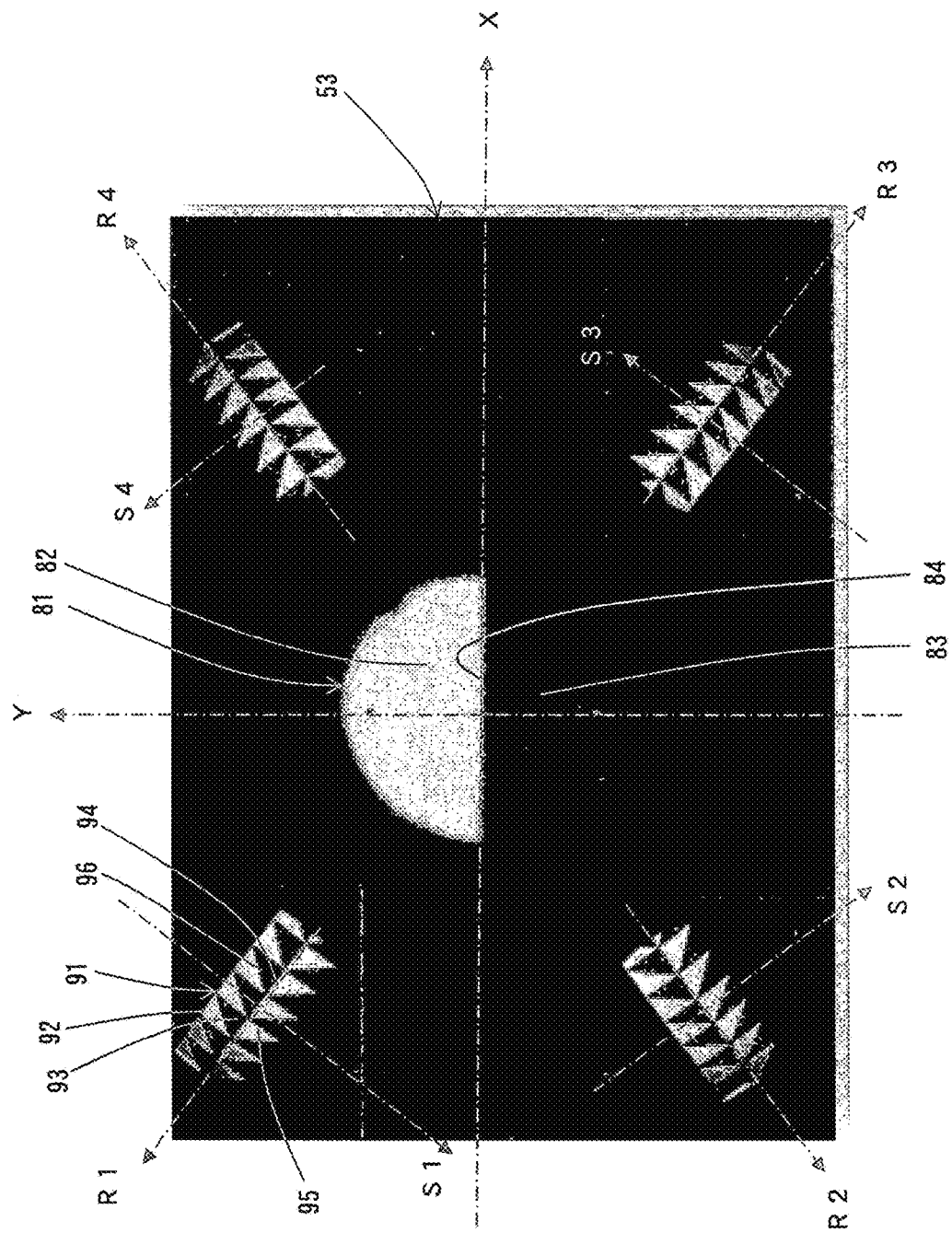
FIG. 12 is a plan view of the respective images of a central measurement chart and peripheral measurement charts formed on the imaging plane of an image sensor.
Figure 13:
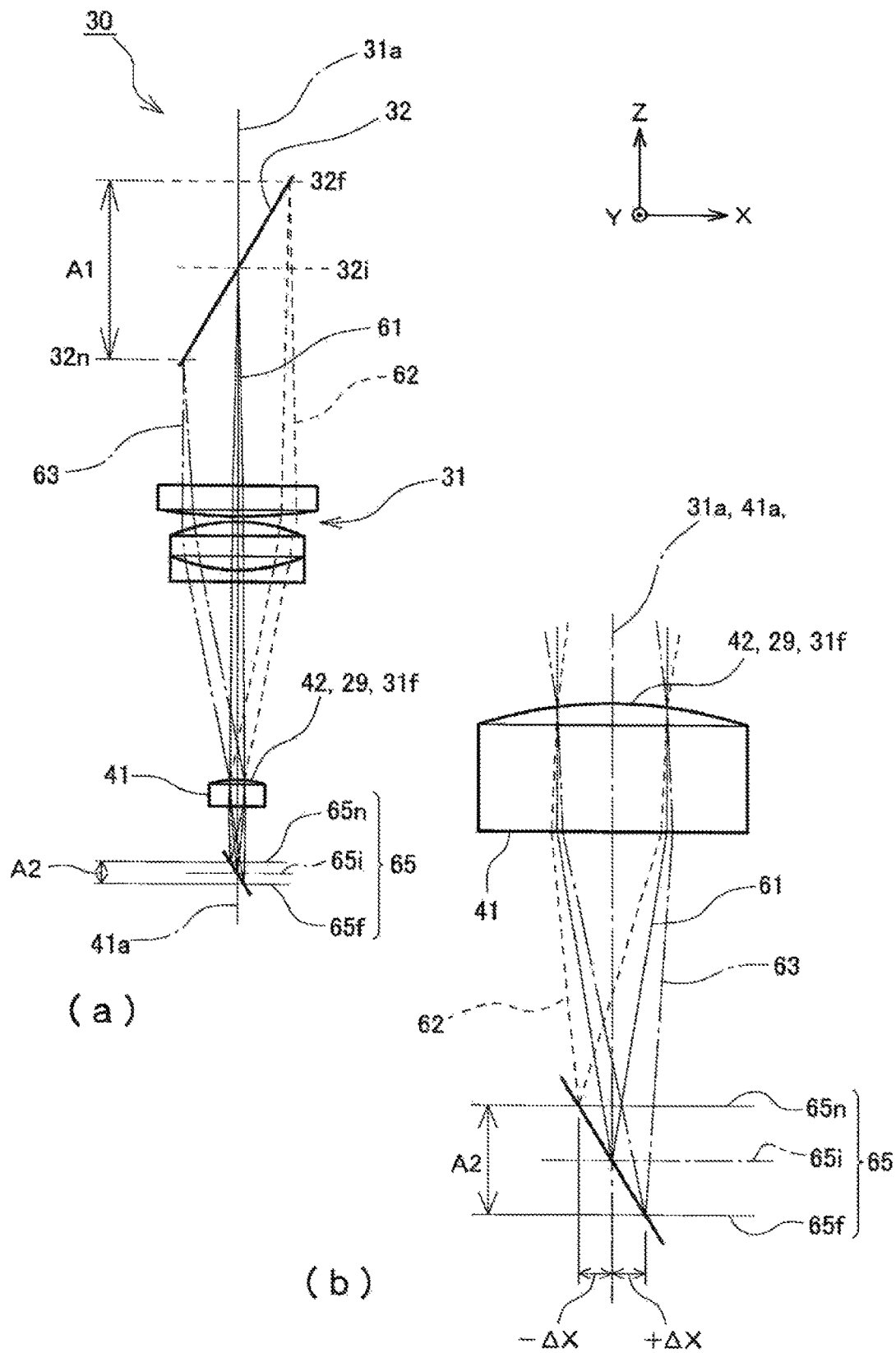
FIG. 13 is an entire optical path diagram (a) relevant to the central optical unit of a camera module manufacturing device according to an embodiment and a detailed partial optical path diagram (b) relevant to an area near the imaging plane.

FIG. 11 is a side view of the optical module 10 along the line B-B illustrated in FIG. 6, illustrating optical paths on a vertical plane containing the diagonal 52a of the image sensor 52. As illustrated in FIG. 11, the light incident into the central measurement chart 32 of the central optical unit 30 passes through the central collimator lens 31, and enters the shooting lens 41 through the entrance pupil 42 to reach the central portion of the image sensor 52. As illustrated in FIG. 12, the light forms an image 81 of the central measurement chart 32 on the central portion on the imaging plane 53 of the image sensor 52. The image 81 contains a white semicircular image 82 caused by the light having passed through the light transmissive portion 32t of the central measurement chart 32, a black image 83 resulting from shielding the light by the light shielding portion 32s, and a boundary image 84 between the white semicircular image 82 and the black image 83. The image 84 is an image of the middle edge 32e of the central measurement chart.

In assembling a camera module 50 including the shooting lens 41 having an angle of view of α1, as the focal length of the shooting lens 41 is long, the image sensor 52 is set at a height P1 having a long distance from the shooting lens 41 in the Z direction. The peripheral optical units 35 are set such that the angle defined by the directions T1 and T3, or the directions of the optical axes 33a, coincides with the angle α1, or the angle of view of the shooting lens 41. With the image sensor 52 and the peripheral optical units 35 set as described above, the images of the peripheral measurement charts 34 of the peripheral optical units 35 are formed on the four respective corners of the image sensor 52. That is, the light beams incident to the respective peripheral collimator lenses 33 of the four peripheral optical units 35 pass through the respective peripheral collimator lenses 33, and enter the shooting lens 41 through the entrance pupil 42 to reach the respective peripheral portions of the four corners of the image sensor 52, as illustrated in FIG. 12. The light forms images 91 of the respective peripheral measurement charts 34 on the four respective peripheral portions of the imaging plane 53 of the image sensor 52, as illustrated in FIG. 12. Each image 91 contains white triangular images 92 caused by the light having passed through the respective light transmissive portions 34t of the peripheral measurement charts 34, black images 93 resulting from shielding the light by the light shielding portions 34s, and boundary images 94 to 96 between the white images 92 and the black images 93. The images 94 to 96 are images of the first edge 34e1 to the third edge 34e3, respectively, of the peripheral measurement chart 34.

As illustrated in FIG. 11, in assembling a camera module 50 including a shooting lens 411 having an angle of view of α2, as the focal length of the shooting lens 411 is short, the image sensor 52 is set at a height P2 having a short distance from the shooting lens 41 in the Z direction. The peripheral optical units 35 are set such that the angle defined by the directions T11 and T31, or the directions of the optical axes 33a, coincides with the angle α2, or the angle of view of the shooting lens 41. With the above, also in assembling a camera module 50 including the shooting lens 411 having an angle of view wider than that of the shooting lens 41, it is possible to form the images of the respective peripheral measurement charts 34 of the peripheral optional units 35 on the respective peripheral portions of the four corners of the image sensor 52, similar to the case in which the shooting lens 41 having the angle of view of α1 is used.

Details of the central optical unit 30 and the image 81 formed on the central portion of the imaging plane 53 by the central optical unit 30 will now be described.

As illustrated in FIG. 13(a), the central collimator lens 31 has a focal point 31f on the side of the shooting lens 41. The lens unit 40 is held such that the focal point 31f of the central collimator lens 31 falls on the central position of the entrance pupil 42 of the shooting lens 41. Consequently, the central collimator lens 31 and the shooting lens 41 together constitute a central measurement chart-side telecentric optical system. The main light beam having passed through the central measurement chart 32 converges toward the focal point 31f through the central collimator lens 31, and enters the shooting lens 41 through the entrance pupil 42 of the shooting lens 41, so that the pattern of the central measurement chart 32 is imaged on an image forming plane 65, as illustrated in FIG. 13(b).

Specifically, the light beam having passed through the central position 32i of the central measurement chart 32, where the optical axis 31a of the central collimator lens 31 passes, proceeds along the optical path 61 indicated by a solid line in FIG. 13(a) and FIG. 13(b), so that the pattern of the central position 32i is imaged on the central portion near the optical axis 31a on a reference image forming plane 65i.

Meanwhile, as the central measurement chart 32 is disposed inclined relative to a plane orthogonal to the optical axis 31a of the central collimator lens 31, the light beam having passed through the distal end 32f of the central measurement chart 32 proceeds along the optical path 62 indicated by a broken line in FIG. 13(a) and FIG. 13(b), so that the pattern of the distal end 32f is imaged on an upper image forming plane 65n positioned on the upper side than the reference image forming plane 65i at a position displaced from the optical axis 31a by an amount −ΔX in the X direction orthogonal to the optical axis 31a.

Further, the light beam having passed through the proximal end 32n of the central measurement chart 32 proceeds along the optical path 63 indicated by an alternate long and short dash line in FIG. 13(a) and FIG. 13(b), so that the pattern of the proximal end 32n is imaged on a lower image forming plane 65f positioned on the lower side in relation to the reference image forming plane 65i at a position displaced from the optical axis 31a by an amount +ΔX in the X direction orthogonal to the optical axis 31a.

Figure 14:
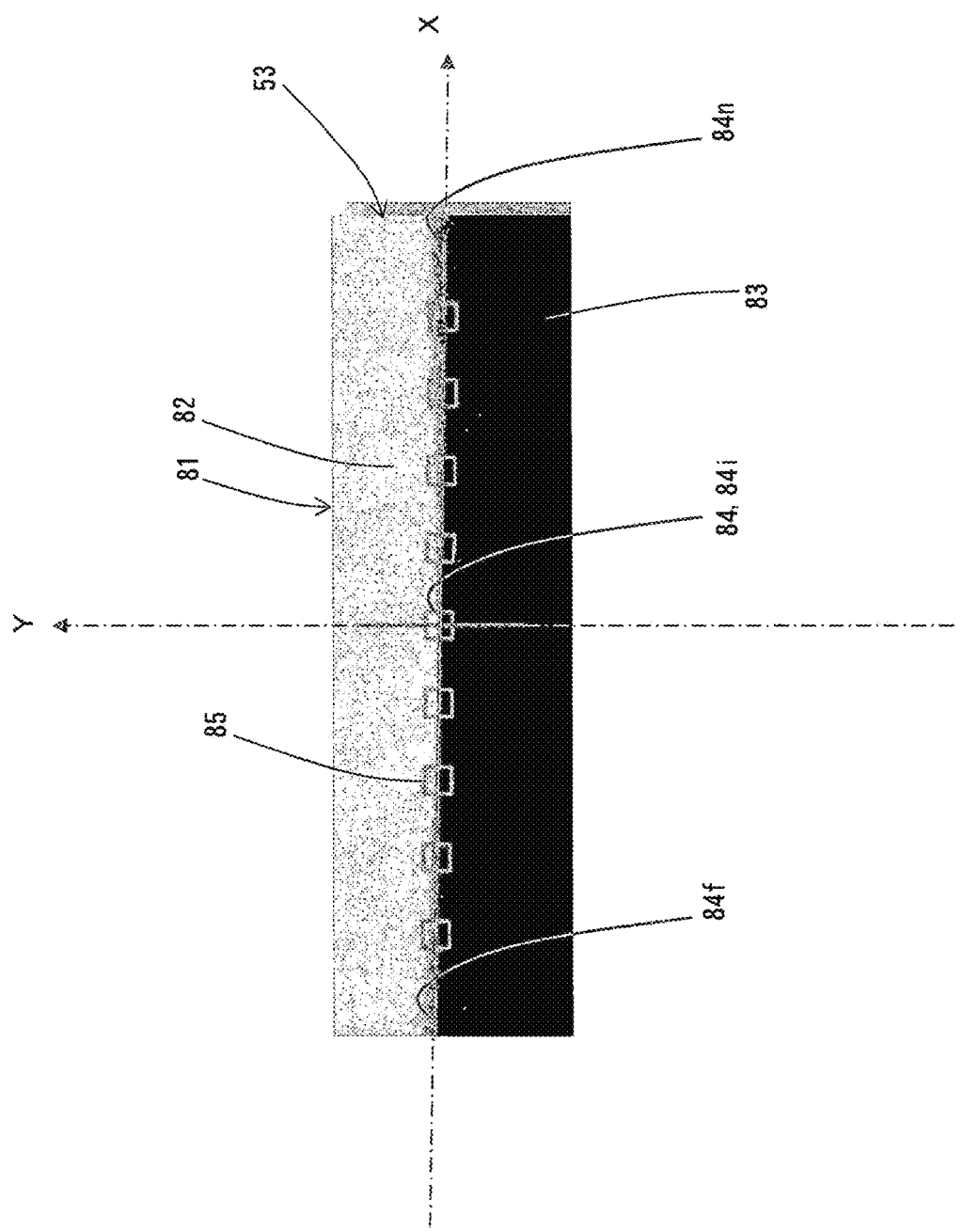
FIG. 14 is an enlarged plan view of the image of the central measurement chart illustrated in FIG. 12.

Thus, in the case where the height of the sensor substrate 51 is adjusted by the six-axis actuator 56 such that the imaging plane 53 is positioned at the height of the reference image forming plane 65i, as illustrated as the central portion illustrated in FIG. 14, the middle edge 32e at the central position 32i of the central measurement chart 32 is imaged on the imaging plane 53 as a sharp image 84i without blur, while the respective middle edges 32e on the distal end 32f and the proximal end 32n are imaged on the imaging plane 53 as blurred images 84f, 84n, respectively The image 81 of the central measurement chart 32 formed on the imaging plane 53, as illustrated in FIG. 14, is converted into a central image signal by the image sensor 52, and inputted to the controller 57. The controller 57 sets measurement points 85 on the image of the middle edge 32e at predetermined intervals along the X direction, as illustrated in FIG. 14, and then calculates focus evaluation values to evaluate whether the images on the respective measurement points 85 are focused. Note that although it is described that spatial frequency response is used as a focus evaluation value in this embodiment, spatial frequency response is not an exclusive example, and any other focus evaluation values, such as a contrast, may be used instead.

Figure 15:
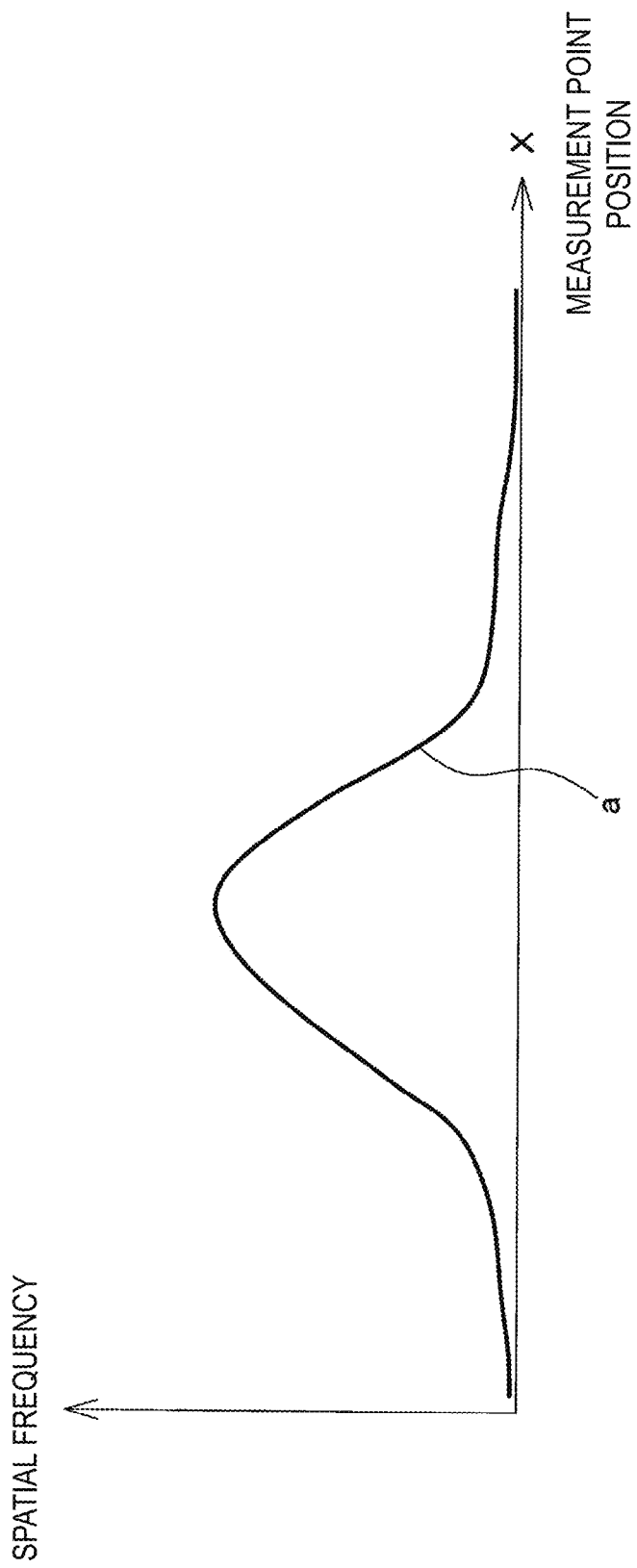
FIG. 15 is a graph showing a change in spatial frequency response relative to the position of a measurement point of the central measurement chart illustrated in FIG. 14.

Using the calculated spatial frequency response at the respective measurement points 85, as illustrated in FIG. 15, the controller 57 generates a central portion through-focus graph that contains a line indicative of a change in spatial frequency response relative to the positions in the X direction, of the measurement points 85 in the central portion of the imaging plane 53.

As the central measurement chart 32 is disposed inclined relative to a plane vertical to the optical axis 31a of the central collimator lens 31 in the central optical unit 30, as described above, the height of the image forming plane 65 of the shooting lens 41 for the central measurement chart 32 changes, such as the upper image forming plane 65n, the reference image forming plane 65i, and the lower image forming plane 65f, relative to the distance from the optical axis 41a of the shooting lens 41 in a direction orthogonal to the optical axis 41a. Hence, it is possible to obtain a plurality of images 81 of the central measurement chart 32 on the image forming plane 65 of the shooting lens 41 at different heights with one image capturing operation. Consequently, it is possible to generate a central portion through-focus graph as illustrated in FIG. 15 with one image capturing operation.

Details of the peripheral optical unit 35 and the image 91 formed on the peripheral portion of the imaging plane 53 by the peripheral optical unit 35 will now be described. Although a case using the shooting lens 41 having the angle of view of α1 and a long focal length will be described below, this is similarly applicable to a case using the shooting lens 411 having the angle of view of α2 and a short focal length.

Similar to the central optical unit 30, the peripheral collimator lens 33 of the peripheral optical unit 35 has a focal point 33f on the side of the shooting lens 41. The focal point 33f of the peripheral collimator lens 33 falls on the central position of the entrance pupil 42 of the shooting lens 41, so that the peripheral collimator lens 33 and the shooting lens 41 constitute a peripheral measurement chart-side telecentric optical system. As illustrated in FIG. 16(a), the main light beam passing through the peripheral measurement chart 34 converges toward the focal point 33f through the peripheral collimator lens 33, and enters the shooting lens 41 through the entrance pupil 42 of the shooting lens 41, so that the pattern of the peripheral measurement chart 34 is imaged on the image forming plane 75, as illustrated in FIG. 16(b).

Specifically, the light beam having passed through the central position 34i of the peripheral measurement chart 34, where the optical axis 33a of the peripheral collimator lens 33 passes, proceeds along an optical path 71 indicated by a solid line in FIG. 16(a) and FIG. 16(b), so that the pattern of the central position 34i is imaged on the reference image forming plane 75i.

Meanwhile, as each peripheral measurement chart 34 is disposed inclined relative to a plane orthogonal to the optical axis 33a of the peripheral collimator lens 33, the light beam having passed through the distal end 34f of the peripheral measurement chart 34 proceeds along the optical path 72 indicated by a broken line in FIG. 16(a) and FIG. 16(b), so that the pattern of the distal end 32f is imaged on an upper image forming plane 75n positioned on the upper side in relation to the reference image forming plane 75i at a position displaced by an amount +ΔR toward the peripheral portion from the position where the pattern of the central position 34i is imaged.

Further, the light beam having passed through the proximal end 34n of the peripheral measurement chart 34 proceeds along the optical path 73 indicated by an alternate long and short dash line in FIG. 16(a) and FIG. 16(b), so that the pattern of the proximal end 34n is imaged on a lower image forming plane 75f positioned on the lower side in relation to the reference image forming plane 75i at a position displaced by an amount −ΔR toward the side of the central portion from the position where the pattern of the central position 34i is imaged.

Figure 17:
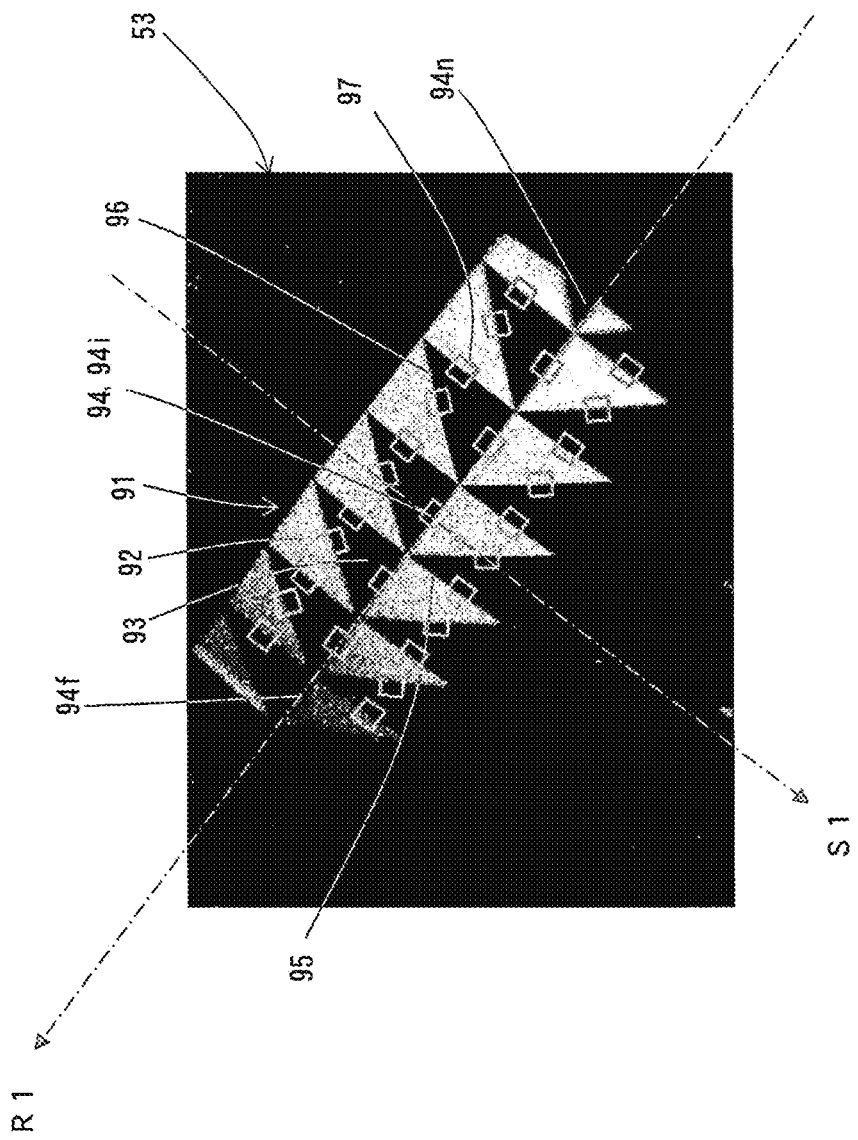
FIG. 17 is an enlarged plan view of an image of the peripheral measurement chart illustrated in FIG. 12.

Thus, in the case where the height of the sensor substrate 51 is adjusted by the six-axis actuator 56 such that the imaging plane 53 is positioned at the height of the reference image forming plane 75i, as illustrated in FIG. 17, the first edge 34e1 near the central position 34i is imaged on the imaging plane 53 in a peripheral portion as a sharp image 94i without blur, and the respective first edges 34e1 of the distal end 32f and of the proximal end 32n are imaged on the imaging plane 53 as blurred images 94f, 94n, respectively.

Figure 18:
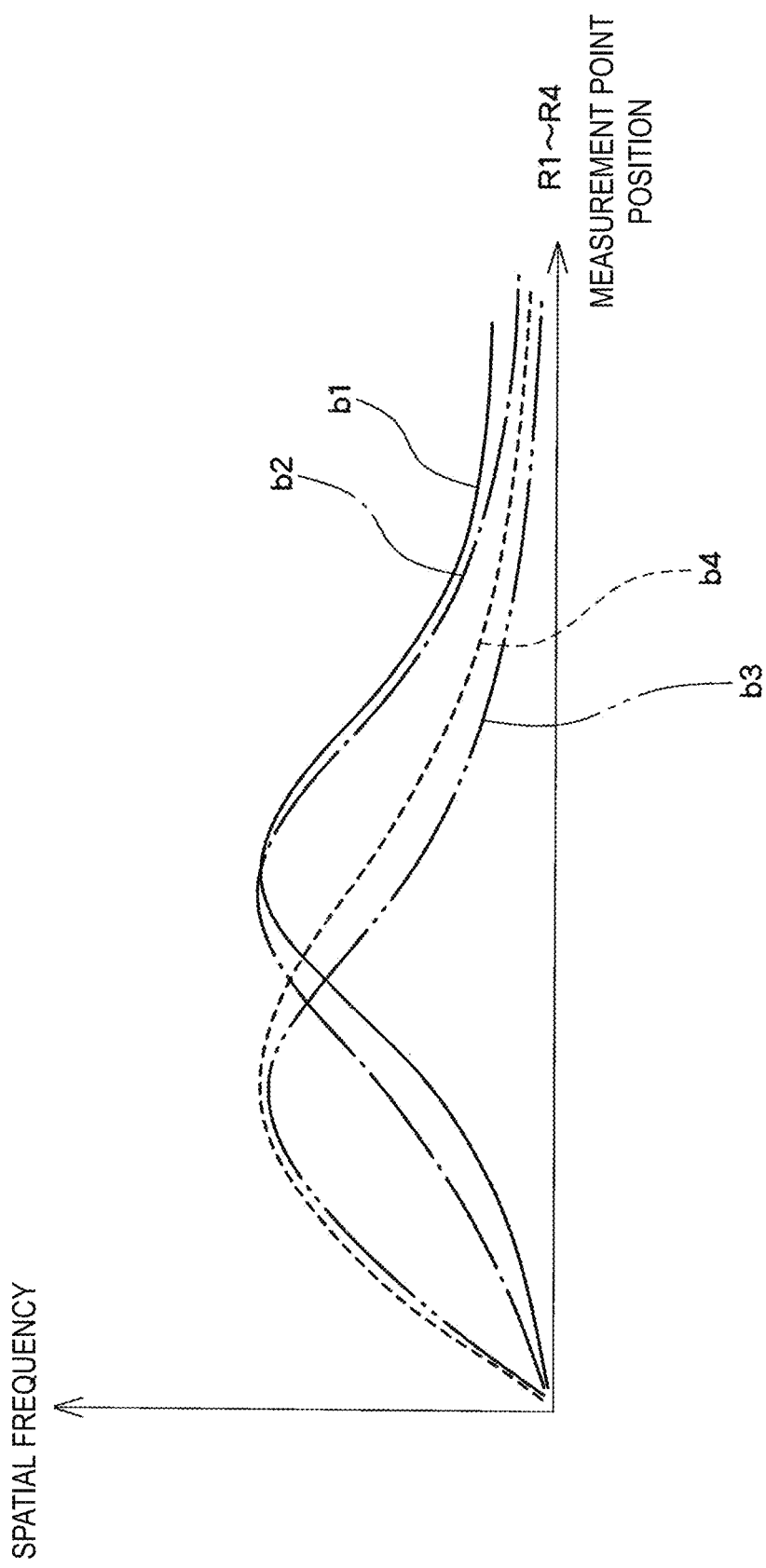
FIG. 18 is graph showing a change in spatial frequency response relative to the position of a measurement point of the peripheral measurement chart illustrated in FIG. 17.

As illustrated in FIG. 17, the controller 57 sets measurement points 97 on the respective images 94 to 96 of the first edge 34e1 to the third edge 34e3 at predetermined intervals along the direction R1. Then, as illustrated in FIG. 18, the controller 57 calculates a spatial frequency response at the respective measurement points 97, and generates a line b1 indicative of a change in spatial frequency response relative to the respective positions of the measurement points 97 in the direction R1 on the peripheral portions of the imaging plane 53. Similarly, the controller 57 generates similar through-focus graphs as to the respective peripheral portions extending in the respective directions R2 to R4. Then, respective lines b1 to b4 relevant to the respective directions R1 to R4 are superimposed on each other to thereby generate a peripheral portion through-focus graph, such as that illustrated in FIG. 18.

Similar to the central optical unit 30, as each peripheral measurement chart 34 is disposed inclined relative to a plane vertical to the optical axis 33a of the peripheral collimator lens 33 in the peripheral optical unit 35 as well, the height of the image forming plane 75 of the shooting lens 41 for each peripheral measurement chart 34 changes, such as the upper image forming plane 75n, the reference image forming plane 75i, and the lower image forming plane 75f, relative to the distance from the optical axis 41a of the shooting lens 41 in a direction orthogonal to the optical axis 41a. Hence, it is possible to obtain a plurality of images 91 of each peripheral measurement chart 34 on the image forming plane 75 of the shooting lens 41 at different heights with one image capturing operation. Consequently, it is possible to generate a peripheral portion through-focus graph, such as that illustrated in FIG. 18, with one image capturing operation.

Utilizing the central portion through-focus graph illustrated in FIG. 15 and the relationship between the height of the image forming plane 65 and the distance in the X direction, illustrated in FIG. 13(b), the controller 57 converts the line a shown in FIG. 15 to a line C shown in FIG. 19(a). The line C here is a line indicative of a change in spatial frequency response relative to the height displacement ΔH between the image forming plane 65 of the shooting lens 41 and the imaging plane 53 of the image sensor 52, in the central portion. Similarly, the lines b1 to b4 shown in FIG. 18 are converted into the respective lines d1 to d4 shown in FIG. 19(a). The lines d1 to d4 here are lines indicative of a change in spatial frequency response relative to the height displacement ΔH between the image forming plane 75 of the shooting lens 41 and the imaging plane 53 of the image sensor 52 in the respective peripheral portions.

Referring to FIG. 19(a), the line C indicates that the spatial frequency response takes a maximum value at the height displacement ΔH1. As the height displacement ΔH1 is negative, it can be determined that the central portion of the imaging plane 53 is positioned lower by an amount ΔH1 relative to the image forming plane 65 of the shooting lens 41, as illustrated in FIG. 19(b). Further, as the lines d1, d3 as well indicate that the spatial frequency response takes maximum values at the height displacement ΔH1, it can be determined that the imaging plane 53 is positioned lower by an amount ΔH1 relative to the image forming plane 75 of the shooting lens 41 in the respective peripheral portions in the directions R1, R3. Similarly, as the lines d2, d4 indicate that the spatial frequency response is maximum at the height displacements ΔH3, ΔH2, respectively, it can be determined that the imaging plane 53 is positioned lower by amounts ΔH3, ΔH2, respectively, relative to the image forming plane 75 of the shooting lens 41 in the respective peripheral portions in the directions R2, R4.

Here, the image forming planes 65, 75 of the shooting lens 41 are the same plane, and the relationship of "the absolute value of ΔH3>the absolute value of ΔH1>the absolute value of ΔH2" is held, and, as illustrated in FIG. 19(b), it is known that the central portion of the imaging plane 53 is positioned lower by a height ΔH1 relative to the image forming planes 65, 75 of the shooting lens 41, and is inclined such that a part thereof on the side of the direction R2 in the direction R2-R4 is positioned lower.

Based on the data shown in FIG. 19(a) and FIG. 19(b), the controller 57 operates the six-axis actuator 56 to slightly elevate the imaging plane 53 to eliminate the inclination in the direction R2-R4.

When the imaging plane 53 becomes substantially the same plane as the image forming planes 65, 75 of the shooting lens 41, as illustrated in FIG. 20(b), through the above-mentioned operation of the six-axis actuator 56, the lines C, d1 to d4 all take maximum values at respective positions with the height displacement ΔH of zero.

After the imaging plane 53 of the image sensor 52 becomes substantially the same plane as the image forming planes 65, 75 of the shooting lens 41, the controller 57 keeps that condition, and then causes a UV emission device, not illustrated, to emit UV light toward adhesive agent to cure the adhesive agent to thereby adhere the lens unit 40 and the sensor substrate 51. Thereupon, assembly of the camera module 50 is completed.

Figure 19:
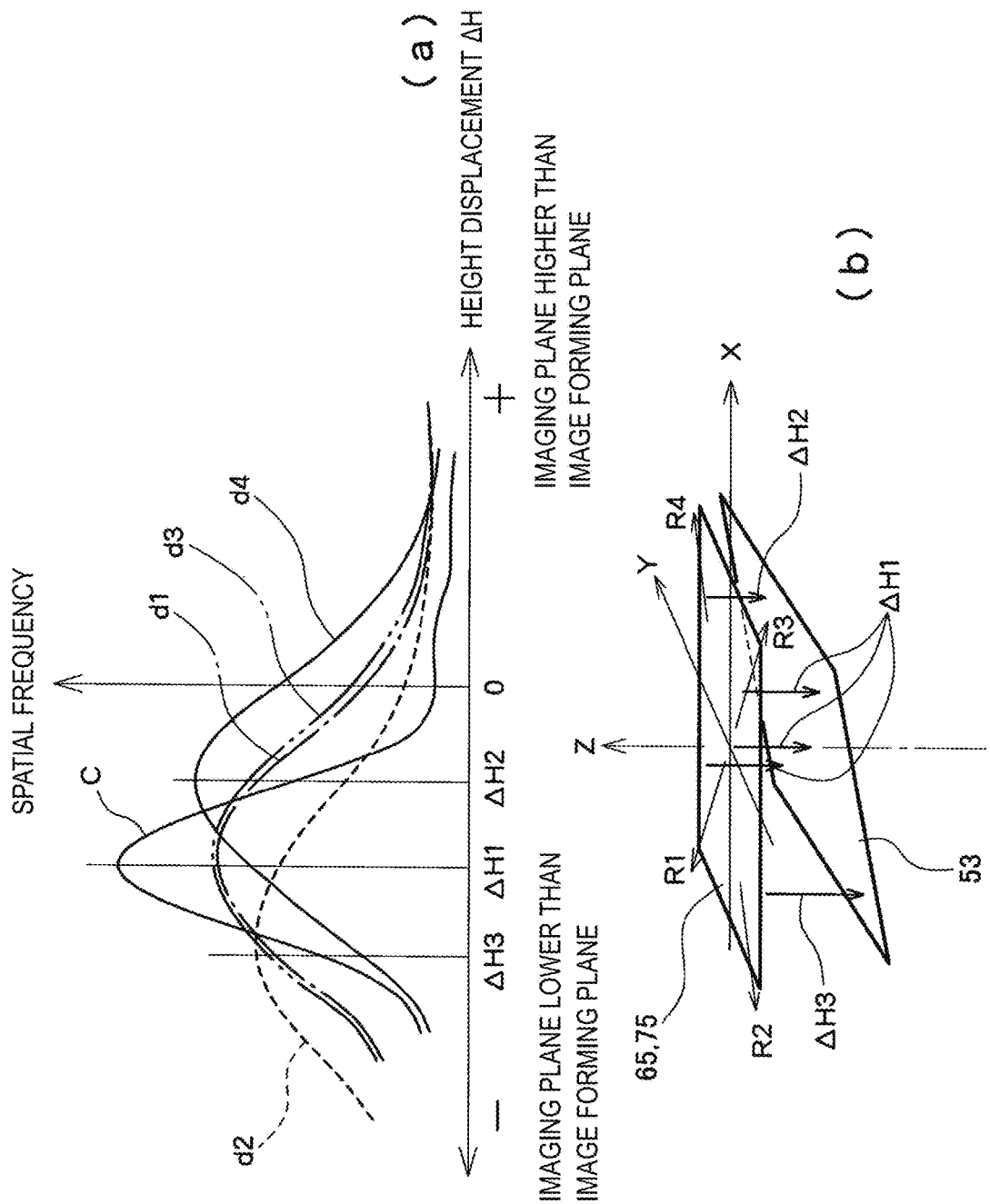
FIG. 19 is a graph showing a change in spatial frequency response relative to the height displacement ΔH between the image forming plane of a shooting lens and the imaging plane of an image sensor in the central and peripheral portions, respectively, of the image sensor when the image forming plane of the shooting lens is placed with height displacement and inclination relative to the imaging plane of the image sensor.
Figure 20:
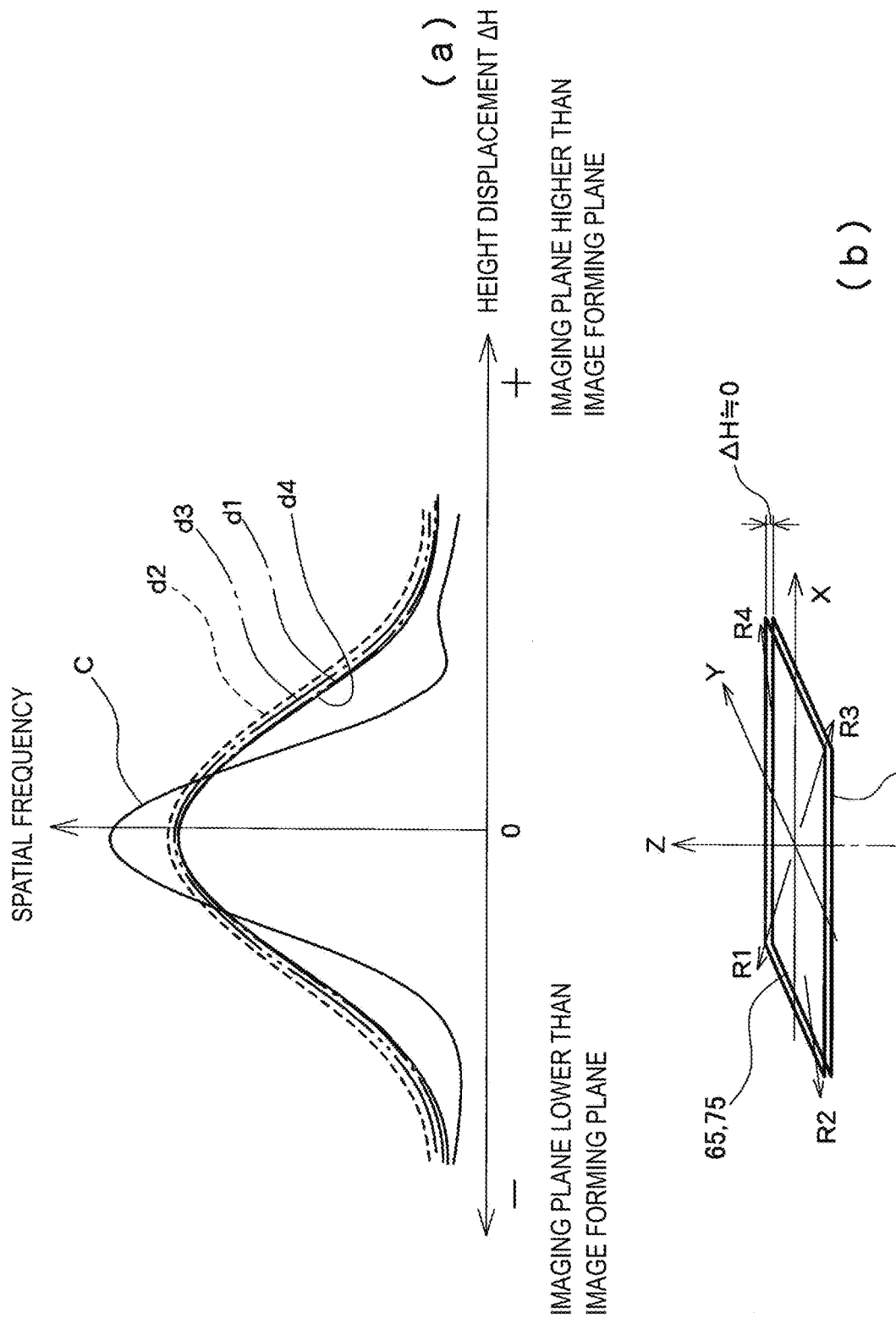
FIG. 20 is a graph showing a change in spatial frequency response relative to the height displacement ΔH between the image forming plane of a shooting lens and the imaging plane of an image sensor in the central and peripheral portions, respectively, of the image sensor when the image forming plane of the shooting lens is adjusted to be substantially the same plane as the imaging plane of the image sensor.

As described above, in the camera module manufacturing device 100 in this embodiment, the controller 57 obtains the image 81 of the central measurement chart 32 and the images 91 of the plurality of peripheral measurement charts 34 formed on the respective image forming planes 65, 75 of the shooting lens 41 at different heights from the image sensor 52 as a central image signal and peripheral image signals, respectively, with one image capturing operation. Then, the central portion through-focus graph illustrated in FIG. 15 and the peripheral portion through-focus graph illustrated in FIG. 18 are generated, and a curved line indicative of a change in spatial frequency response relative to the height displacement ΔH between the image forming plane 65, 75 of the shooting lens 41 and the imaging plane 53 of the image sensor 52, illustrated in FIG. 19, is generated, so that the height and inclination of the imaging plane 53 can be adjusted. As described above, the camera module manufacturing device 100 in this embodiment can obtain change characteristics in spatial frequency response relative to the height displacement ΔH between the respective image forming planes 65, 75 of the shooting lens 41 and the imaging plane 53 of the image sensor 52 in the central portion and the plurality of peripheral portions, respectively, of the image sensor 52 with one image capturing operation, and can adjust the lens unit 40 and the sensor substrate 51 in the height direction and the inclination direction at the same time. This makes it possible to adjust the relative positions of the lens unit 40 and the sensor substrate 51 in a short period of time, to thereby further improve productivity.

In the camera module manufacturing device 100 in this embodiment, the respective peripheral optical units 35 can move in an arc manner, as indicated by the arrows 101, 102, above the shooting lens 41 with the respective optical axes 33a of the peripheral collimator lenses 33 passing through the one point 29, on respective vertical planes containing the two respective diagonals 52a, 52b of the image sensor 52. As the angle of inclination of the optical axis 33a of the peripheral collimator lens 33 of each peripheral optical unit 35 relative to the optical axis 31a of the central collimator lens 31 is changeable, as described above, changing the angle of inclination in accordance with the angle of view of the shooting lens 41 enables formation of the images of the peripheral measurement charts 34 on the respective peripheral portions at four corners of the image sensor 52. This makes it possible to manufacture the camera modules 50 including shooting lenses 41 with different angles of view or focal lengths with a simple method.

In the camera module manufacturing device 100 in this embodiment, the lens unit 40 is held such that the position of the focal point 31f of the central collimator lens 31 and the positions of the focal points 33f of the peripheral collimator lenses 33 fall on the central position of the entrance pupil 42 of the shooting lens 41, whereby the central collimator lens 31 and the shooting lens 41 constitute a central measurement chart-side telecentric optical system, and each peripheral collimator lens 33 and the shooting lens 41 constitute a peripheral measurement chart-side telecentric optical system. Further, the central collimator lens 31 and the peripheral collimator lenses 33 form the images of the central measurement chart 32 and the peripheral measurement charts 34 in the central portion and the peripheral portions, respectively, of the image sensor 52 through the entrance pupil 42 of the shooting lens 41. Hence, even when the central measurement chart 32 and the peripheral measurement charts 34 are disposed inclined relative to respective planes vertical to the respective optical axes 31a, 33a, the dimension of the image 81 of the central measurement chart 32 and those of the images 91 of the peripheral measurement charts 34 formed on the imaging plane 53 of the image sensor 52 remain unchanged. This can reduce error factors, and improve accuracy so that the spatial frequency response can be calculated with high accuracy.

Alternatively, the central collimator lens 31 and the shooting lens 41 and the peripheral collimator lenses 33 and the shooting lens 41 may not constitute the respective telecentric optical systems. In this case as well, the central collimator lens 31 and the peripheral collimator lenses 33 form an image of the central measurement chart 32 and images of the peripheral measurement charts 34, respectively, on the central portion and the peripheral portions, respectively, of the image sensor 52 through the entrance pupil 42 of the shooting lens 41. With disposition of the central measurement chart 32 and the peripheral measurement charts 34 so as to be inclined relative to the respective planes vertical to the optical axis 31a of the central collimator lens 31 and to the respective optical axes 33a of the peripheral collimator lenses 33, an image 81 which has the image forming planes 65 of the shooting lens 41 at heights that vary in accordance with the distance from the optical axis 31a of the central collimator lens 31 in a direction orthogonal to the optical axis 31a is formed on the imaging plane of the image sensor 52, and an image 91 which has the image forming planes 75 of the shooting lens 41 at heights that vary in accordance with the distance from the optical axis 33a of each peripheral collimator lens 33 in the direction orthogonal to the optical axis 33a is formed on the imaging plane of the image sensor 52. This enables highly accurate calculation of a focus evaluation value, such as the spatial frequency response, with one image capturing operation. This enables adjustment of the lens unit and the sensor substrate in a short period, and thus further improvement in productivity.

Figure 21:
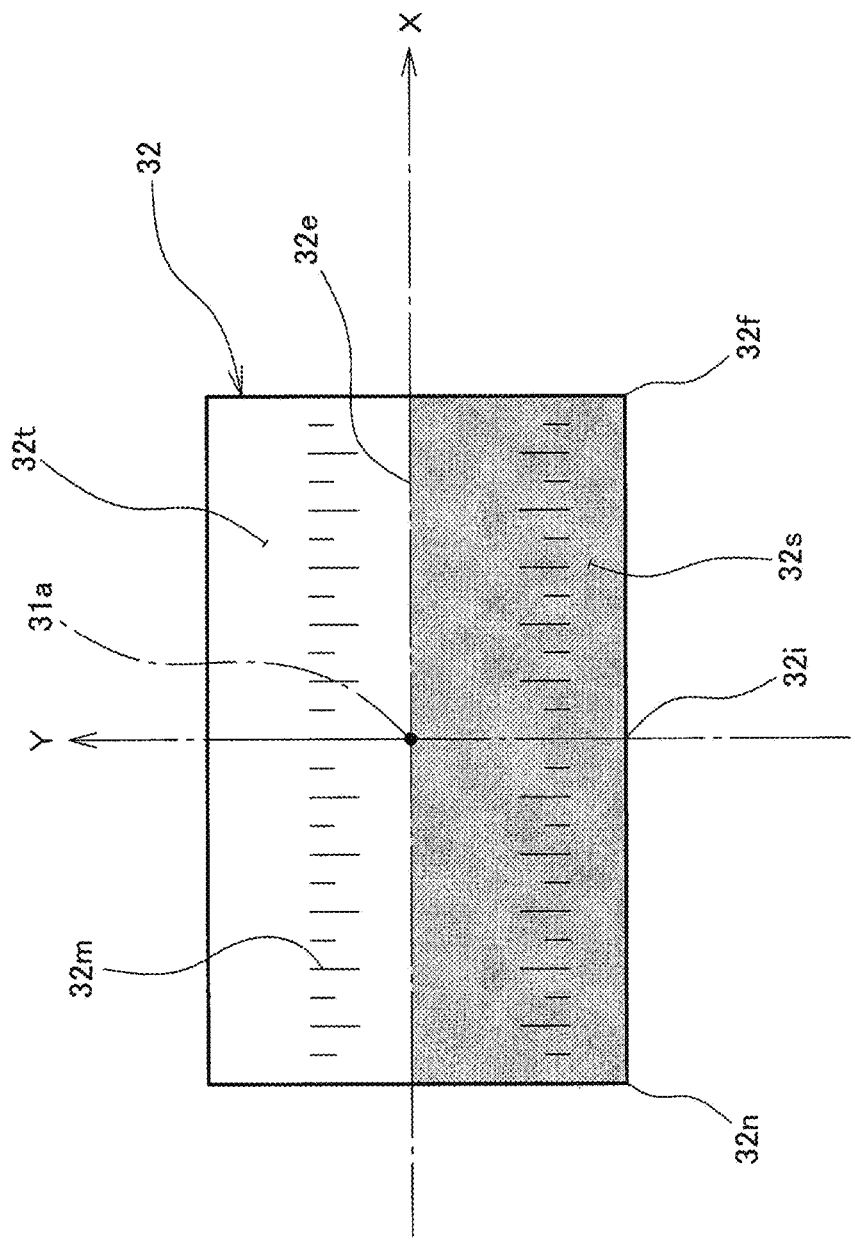
FIG. 21 is a plan view of a pattern of a central measurement chart in another embodiment.

In this case, a scale 32m for absolute positions is marked on the central measurement chart 32, as illustrated in FIG. 21, and a similar scale is marked on each peripheral measurement chart 34 as well. Then, a spatial frequency response is calculated with reference to the scales 32m. This can achieve a similar level of accuracy as that which is achieved with a telecentric optical system.

The ratio (A1/A2) of the difference A1 in height along the optical axis 31a of the central collimator lens 31 between the distal end 32f and the proximal end 32n of the central measurement chart 32 to the difference A2 in height between the upper image forming plane 65n and the lower image forming plane 65f, as illustrated in FIG. 13(a), and the ratio of the focal length f1 of the central collimator lens 31 to the focal length f2 of the shooting lens 41 hold the relationship expressed by the expression (1) below.

$$A1/A2 = (f1/f2)^2 \qquad (1)$$

Figure 16:
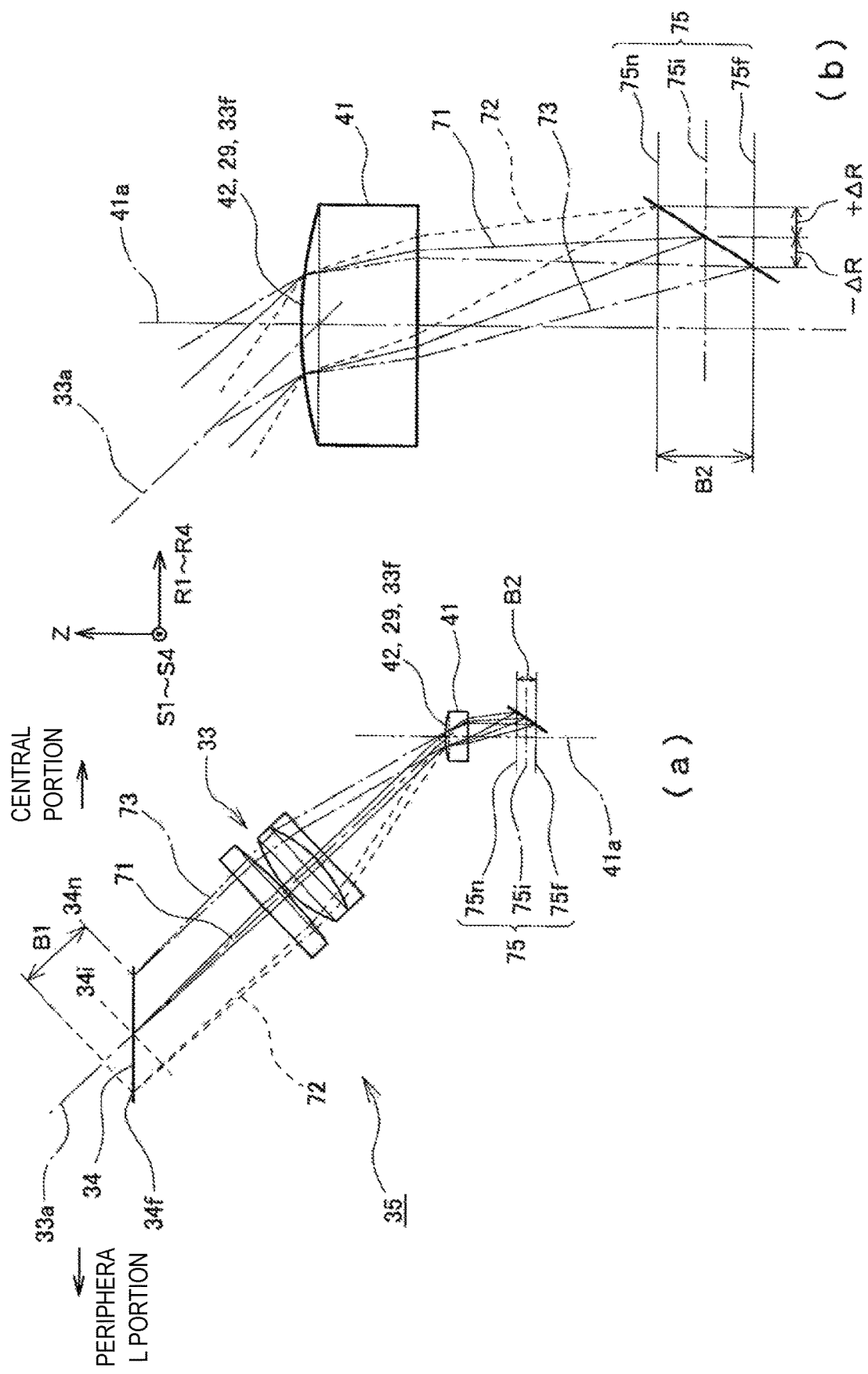
FIG. 16 is an entire optical path diagram (a) relevant to the peripheral optical unit of a camera module manufacturing device according to an embodiment and a detailed partial optical path diagram (b) relevant to an area near the imaging plane.

Similarly, the ratio (B1/B2) of the difference B1 in distance along the optical axis 33a of the peripheral collimator lens 33 between the distal end 34f and the proximal end 34n of each peripheral measurement chart 34 to the height difference B2 between the upper image forming plane 75n and the lower image forming plane 75f, as illustrated in FIG. 16 (a), and the ratio of the focal length g1 of the peripheral collimator lens 33 to the local focal length f3 of the shooting lens 41 hold the relationship expressed by the expression (2) below.

$$B1/B2 = (g1/f3)^2 \qquad (2)$$

wherein the local focal length f3 is, for example, a local focal length expressed as $f3 = f2/\cos(\theta)$ with θ representing the view of angle relative to the optical axis 41a.

Note that the differences A2, B2 in height between the respective upper image forming planes 65n, 75n and the respective lower image forming planes 65f, 75f are within a range for height adjustment of the sensor substrate 51. Thus, changing the respective angles and lengths of the central measurement chart 32 and the respective peripheral measurement charts 34 relative to the respective planes vertical to the optical axes 31a, 33a, based on the focal length f2 and the local focal length f3, respectively, of the shooting lens 41 enables adjustment of the respective height differences A2, B2, to thereby adjust the range for height adjustment of the sensor substrate 51 in accordance with the shooting lens 41.

Although it is described that the controller 57 holds the lens unit 40 such that the optical axis 41a of the shooting lens 41 is coaxial with the optical axis 31a of the central collimator lens 31, and that the position of the focal point 31f of the central collimator lens 31 and the position of the focal point 33f of each peripheral collimator lens 33 fall on the central position of the entrance pupil 42 of the shooting lens 41 in the camera module manufacturing device 100 in this embodiment, this is not an exclusive example. Provided that the positions of the respective focal points 31f, 33f fall on the central position of the entrance pupil 42, the optical axis 41a of the shooting lens 41 may be displaced from a coaxial axis with the optical axis 31a of the central collimator lens 31. Further, the lens unit 40 may be held such that the position of the focal point 31f of the central collimator lens 31 falls on the position of the focal point 33f of each peripheral collimator lens 33 not necessarily on the central position of the entrance pupil 42 of the shooting lens 41 but within the range of the area of the entrance pupil 42.

Although it is described that the peripheral optical units 35 are disposed such that the angles defined by the optical axes 33a of the adjacent peripheral collimator lenses 33 on a plane vertical to the optical axis 31a of the central collimator lens 31 are coincident with the respective angles θ1, θ2 defined by the two diagonals 52a, 52b of the rectangular image sensor in the camera module manufacturing device 100 in this embodiment, this is not an exclusive example. Provided that the angles are substantially coincident with the respective angles θ1, θ2 defined by the diagonals 52a, 52b, the angles do not necessarily coincide with the angles θ1, θ2. For example, provided that the respective peripheral optical units 35 are disposed such that the optical axes 33a of the adjacent peripheral collimator lenses 33 cross each other on a plane vertical to the optical axis 31a of the central collimator lens 31, the respective angles defined by the respective optical axes may not coincide with the angles θ1, θ2 defined by the diagonals 52a, 52b.

Although it is described that the six-axis actuator 56 adjusts the position of the stage 55 in the six respective directions; namely, in the X, Y, and Z directions and around the X, Y, and Z axes, to thereby adjust the relative position of the sensor substrate 51 relative to the lens unit 40 in the camera module manufacturing device 100 in this embodiment, this is not an exclusive example. Provided that the relative positions of the lens unit 40 and the sensor substrate 51 can be adjusted, based on a central image signal obtained by converting by the image sensor 52 the image of the central measurement chart 32 formed on the central portion of the image sensor 52 by the central optical unit 30, and peripheral image signals obtained by converting by the image sensor 52 the images of the peripheral measurement charts 34 formed on the respective different peripheral portions of the image sensor 52 by the plurality of peripheral optical units, the relative position of the lens unit 40 to the sensor substrate 51 may be adjusted by the robot arm 45 moving in the six axial directions. In this case, the robot arm 45 holds the lens unit 40 such that the position of the focal point 31f of the central collimator lens 31 falls on the position of the focal point 33f of each peripheral collimator lens 33 not necessarily at the central position of the entrance pupil 42 of the shooting lens 41, but within the range of the area of the entrance pupil 42, to thereby adjust the relative position of the lens unit 40 relative to the sensor substrate 51. In the case where the displacement between the central position of the entrance pupil 42 of the shooting lens 41, the position of the focal point 31f of the central collimator lens 31, and the positions of the respective focal points 33f of the peripheral collimator lenses 33 are larger than a predetermined threshold, adjustment of the relative positions may be terminated.

In this case, the driving mechanism of the robot arm 45 constitutes a movement mechanism. Further, the robot arm 45 and the stage 55 may be cooperatively moved in the six axial directions to adjust the relative positions of the lens unit 40 and the sensor substrate 51. In this case, the driving mechanism of the robot arm 45 and the six-axis actuator 56 constitute a movement mechanism. As such, the movement mechanism is a mechanism for relatively moving either one or both of the robot arm 45 and the stage 55 relative to the other.

The invention claimed is:

1. A camera module manufacturing device for adjusting relative positions of a lens unit having a built-in shooting lens and a sensor substrate carrying an image sensor for converting an image formed through the shooting lens into an image signal, and adhering the lens unit and the sensor substrate, with the relative positions adjusted, the camera module manufacturing device comprising:
   an optical module including:
      a central optical unit including a central collimator lens and a central measurement chart disposed inclined relative to a plane vertical to an optical axis of the central collimator lens, the central optical unit being for forming an image of the central measurement chart on a central portion of the image sensor through the central collimator lens and the shooting lens, and
      at least two peripheral optical units each including a peripheral collimator lens and a peripheral measurement chart disposed inclined relative to a plane vertical to an optical axis of the peripheral collimator lens, each peripheral optical unit being for forming images of the peripheral measurement chart on different peripheral portions of the image sensor through the peripheral collimator lens and the shooting lens; and
   a controller for adjusting the relative positions of the lens unit and the sensor substrate, based on a central image signal obtained by converting by the image sensor the image of the central measurement chart formed on the central portion of the image sensor by the central optical unit, and respective peripheral image signals obtained by converting by the image sensor the respective images of the respective peripheral measurement charts formed on the respective peripheral portions of the image sensor by the respective peripheral optical units,
   wherein
   each peripheral optical unit includes the peripheral collimator lens and the peripheral measurement chart that are disposed in a casing, and the optical axis of the peripheral collimator lens is inclined relative to the optical axis of the central collimator lens of the central optical unit, and an angle of inclination is adjustable.

2. The camera module manufacturing device according to claim 1, wherein the respective peripheral optical units are disposed such that the optical axes of the adjacent peripheral collimator lenses cross each other on a plane vertical to the optical axis of the central collimator lens.

3. The camera module manufacturing device according to claim 2, wherein the image sensor is rectangular, and the respective peripheral optical units are disposed such that respective angles defined by the optical axes of the adjacent peripheral collimator lenses on the plane vertical to the optical axis of the central collimator lens are coincident with respective angles defined by two diagonals of the image sensor.

4. The camera module manufacturing device according to claim 2, further comprising:

a sensor substrate holding unit for holding the sensor substrate carrying the image sensor mounted thereon, wherein the sensor substrate holding unit holds the sensor substrate inside the plane vertical to the optical axis of the central collimator lens such that respective directions of the diagonals of the image sensor coincide with respective directions of the optical axes of the respective peripheral collimator lenses on the plane vertical to the optical axis of the central collimator lens.

5. The camera module manufacturing device according to claim 2, further comprising:

a lens unit holding unit for holding the lens unit, wherein each peripheral optical unit is disposed such that a focal position of the peripheral collimator lens is the same position as a focal position of the central collimator lens of the central optical unit, the lens unit holding unit holds the lens unit such that the focal position of the central collimator lens and the focal position of each peripheral collimator lens fall on a position of an entrance pupil of the shooting lens, the central collimator lens of the central optical unit forms an image of the central measurement chart through the entrance pupil of the shooting lens on the central portion of the image sensor, and the respective peripheral collimator lenses of the peripheral optical units form images of the respective peripheral measurement charts on respective different peripheral portions of the image sensor through the entrance pupil of the shooting lens.

6. The camera module manufacturing device according to claim 5, wherein the lens unit holding unit holds the lens unit such that an optical axis of the shooting lens is coaxial with the optical axis of the central collimator lens, and that the focal position of the central collimator lens and the focal position of each peripheral collimator lens fall on a central position of the entrance pupil of the shooting lens.

7. The camera module manufacturing device according to claim 3, further comprising:

a sensor substrate holding unit for holding the sensor substrate carrying the image sensor mounted thereon, wherein the sensor substrate holding unit holds the sensor substrate inside the plane vertical to the optical axis of the central collimator lens such that respective directions of the diagonals of the image sensor coincide with respective directions of the optical axes of the respective peripheral collimator lenses on the plane vertical to the optical axis of the central collimator lens.

8. The camera module manufacturing device according to claim 3, further comprising:

a lens unit holding unit for holding the lens unit, wherein each peripheral optical unit is disposed such that a focal position of the peripheral collimator lens is the same position as a focal position of the central collimator lens of the central optical unit, the lens unit holding unit holds the lens unit such that the focal position of the central collimator lens and the focal position of each peripheral collimator lens fall on a position of an entrance pupil of the shooting lens, the central collimator lens of the central optical unit forms an image of the central measurement chart through the entrance pupil of the shooting lens on the central portion of the image sensor, and the respective peripheral collimator lenses of the peripheral optical units form images of the respective peripheral measurement charts on respective different peripheral portions of the image sensor through the entrance pupil of the shooting lens.

9. The camera module manufacturing device according to claim 4, further comprising:

a lens unit holding unit for holding the lens unit, wherein each peripheral optical unit is disposed such that a focal position of the peripheral collimator lens is the same position as a focal position of the central collimator lens of the central optical unit, the lens unit holding unit holds the lens unit such that the focal position of the central collimator lens and the focal position of each peripheral collimator lens fall on a position of an entrance pupil of the shooting lens, the central collimator lens of the central optical unit forms an image of the central measurement chart through the entrance pupil of the shooting lens on the central portion of the image sensor, and the respective peripheral collimator lenses of the peripheral optical units form images of the respective peripheral measurement charts on respective different peripheral portions of the image sensor through the entrance pupil of the shooting lens.

10. The camera module manufacturing device according to claim 7, further comprising:

a lens unit holding unit for holding the lens unit, wherein each peripheral optical unit is disposed such that a focal position of the peripheral collimator lens is the same position as a focal position of the central collimator lens of the central optical unit, the lens unit holding unit holds the lens unit such that the focal position of the central collimator lens and the focal position of each peripheral collimator lens fall on a position of an entrance pupil of the shooting lens, he central collimator lens of the central optical unit forms an image of the central measurement chart through the entrance pupil of the shooting lens on the central portion of the image sensor, and the respective peripheral collimator lenses of the peripheral optical units form images of the respective peripheral measurement charts on respective different peripheral portions of the image sensor through the entrance pupil of the shooting lens.

11. The camera module manufacturing device according to claim 8, wherein
the lens unit holding unit holds the lens unit such that an optical axis of the shooting lens is coaxial with the optical axis of the central collimator lens, and that the focal position of the central collimator lens and the focal position of each peripheral collimator lens fall on a central position of the entrance pupil of the shooting lens.

12. The camera module manufacturing device according to claim 9, wherein
the lens unit holding unit holds the lens unit such that an optical axis of the shooting lens is coaxial with the optical axis of the central collimator lens, and that the focal position of the central collimator lens and the focal position of each peripheral collimator lens fall on a central position of the entrance pupil of the shooting lens.

13. The camera module manufacturing device according to claim 10, wherein
the lens unit holding unit holds the lens unit such that an optical axis of the shooting lens is coaxial with the optical axis of the central collimator lens, and that the focal position of the central collimator lens and the focal position of each peripheral collimator lens fall on a central position of the entrance pupil of the shooting lens.

* * * * *